United States Patent
Nishida et al.

(10) Patent No.: US 11,669,055 B2
(45) Date of Patent: Jun. 6, 2023

(54) VIBRATION SUPPRESSION DEVICE, METHOD AND COMPUTER-READABLE MEDIUM USING ESTIMATED VIBRATION TORQUE

(71) Applicant: KOBE STEEL, LTD., Hyogo (JP)

(72) Inventors: Yoshiharu Nishida, Kobe (JP); Mami Yomoda, Kobe (JP); Naoki Kida, Fujisawa (JP)

(73) Assignee: KOBE STEEL, LTD., Hyogo (JP)

( * ) Notice: Subject to any disclaimer, the term of this patent is extended or adjusted under 35 U.S.C. 154(b) by 247 days.

(21) Appl. No.: 17/268,043

(22) PCT Filed: Aug. 19, 2019

(86) PCT No.: PCT/JP2019/032249
§ 371 (c)(1),
(2) Date: Feb. 11, 2021

(87) PCT Pub. No.: WO2020/070988
PCT Pub. Date: Apr. 9, 2020

(65) Prior Publication Data
US 2021/0216048 A1    Jul. 15, 2021

(30) Foreign Application Priority Data

Oct. 4, 2018 (JP) .............................. JP2018-188826

(51) Int. Cl.
*G05B 11/36* (2006.01)
*F16F 15/18* (2006.01)
(Continued)

(52) U.S. Cl.
CPC .............. *G05B 11/36* (2013.01); *F16F 15/18* (2013.01); *G05B 13/02* (2013.01); *H02P 29/00* (2013.01)

(58) Field of Classification Search
None
See application file for complete search history.

(56) References Cited

U.S. PATENT DOCUMENTS

2007/0143040 A1*  6/2007 Ide ..................... G01M 1/10
                                                 702/41
2008/0035411 A1*  2/2008 Yamashita ........... B62D 5/049
                                                 180/443
(Continued)

FOREIGN PATENT DOCUMENTS

JP   H07-337058 A   12/1995
JP   2013-118817 A   6/2013
JP   2014-117787 A   6/2014

OTHER PUBLICATIONS

International Preliminary Report on Patentability and Written Opinion issued in PCT/JP2019/032249; dated Apr. 15, 2021.
(Continued)

*Primary Examiner* — Bernard G Lindsay
(74) *Attorney, Agent, or Firm* — Studebaker & Brackett PC

(57) ABSTRACT

A vibration suppression device that suppresses vibration of an operation unit in a mechanical system having a natural vibration mode including the operation unit, an actuator unit that operates the operation unit, and an elastic body that couples the operation unit and the actuator unit, the vibration suppression device including a generation means for generating a drive signal for driving the actuator unit, an estimation means for estimating a measurement amount related to the mechanical system, a correction means for correcting the drive signal generated by the generation means on the basis of the measurement amount estimated by the estimation means, and a change means for changing a gain used by the estimation means so that an influence of an increase in a (Continued)

modeling error becomes small in a period in which the modeling error of the mechanical system increases.

6 Claims, 22 Drawing Sheets

(51) Int. Cl.
*G05B 13/02* (2006.01)
*H02P 29/00* (2016.01)

(56) References Cited

U.S. PATENT DOCUMENTS

| | | | | |
|---|---|---|---|---|
| 2013/0311044 A1* | 11/2013 | Tamaizumi | ............... | B62D 6/08 |
| | | | | 701/42 |
| 2014/0300308 A1* | 10/2014 | Ikeda | ....................... | H02P 21/18 |
| | | | | 318/561 |
| 2017/0205439 A1* | 7/2017 | Liu | ........................... | G01P 3/48 |
| 2019/0072935 A1* | 3/2019 | Katsura | ................ | G05B 19/404 |

OTHER PUBLICATIONS

The extended European search report issued by the European Patent Office dated Jun. 7, 2022, which corresponds to European Patent Application No. 19869956.3-1202 and is related to U.S. Appl. No. 17/268,043.

* cited by examiner

VIBRATION SUPPRESSION DEVICE, METHOD AND COMPUTER-READABLE MEDIUM USING ESTIMATED VIBRATION TORQUE

CROSS-REFERENCE TO RELATED APPLICATIONS

This is a national phase application in the United States of International Patent Application No. PCT/JP2019/032249 with an international filing date of Aug. 19, 2019, which claims priority of Japanese Patent Application No. 2018-188826 filed on Oct. 4, 2018 the contents of which are incorporated herein by reference.

TECHNICAL FIELD

The present invention relates to a vibration suppression device, a vibration suppression method, and a program that suppress vibration of an operation unit in a mechanical system having a natural vibration mode including the operation unit, an actuator unit that operates the operation unit, and an elastic body that couples the operation unit and the actuator unit.

BACKGROUND ART

An open-loop vibration suppression method is known in which a current corresponding to a disturbance torque obtained from a disturbance observer attached to a motor in a drive system including an elastic body is passed through a band-pass filter to obtain a vibration torque (current value) generated in the elastic body, the current value (torque) is amplified by a gain Kc, and is subtracted from a current command (torque command) of the motor (see JP H7-337058 A, for example).

SUMMARY

Here, when a configuration is adopted in which the disturbance torque obtained from the disturbance observer is filtered to extract the vibration torque and the torque command is corrected by the open-loop control, if the influence of the modeling error of the mechanical system is large, there is a possibility that an erroneous vibration torque component is extracted by the filter processing and an erroneous vibration suppression is performed.

It is an object of the present invention to reduce the possibility of erroneous vibration suppression due to a modeling error of a mechanical system.

With such object, the present invention provides a vibration suppression device that suppresses vibration of an operation unit in a mechanical system having a natural vibration mode including the operation unit, an actuator unit that operates the operation unit, and an elastic body that couples the operation unit and the actuator unit, the vibration suppression device including a generation means for generating a drive signal for driving the actuator unit, an estimation means for estimating a measurement amount related to the mechanical system, a correction means for correcting the drive signal generated by the generation means on the basis of the measurement amount estimated by the estimation means, and a change means for changing a gain used by the estimation means so that an influence of an increase in a modeling error becomes small in a period in which the modeling error of the mechanical system increases.

Here, the period in which the modeling error increases may be a period before and after the direction of the angular velocity of the actuator unit is inverted.

The estimation means may estimate the measurement amount by using a differential value of the state quantity in the equation of state of the mechanical system.

Furthermore, the correction means may correct the drive signal by performing positive feedback based on the measurement amount to the drive signal.

The measurement amount may be an estimation value of vibration torque of the actuator unit or an estimation value of a differential value of vibration torque of the actuator unit. In that case, the estimation means may calculate an estimation value of the vibration torque or an estimation value of a differential value of the vibration torque from a estimated disturbance by performing filter processing to the estimated disturbance. The change means may use a convergence gain in the filter processing as the gain.

Furthermore, the measurement amount may be an estimation value of vibration torque of the actuator unit or a differential value of an estimation value of vibration torque of the actuator unit. In that case, the estimation means may calculate an estimation value of the vibration torque from an estimated disturbance by performing a least squares estimation with forgetting factor and weight for the estimated disturbance. The change means may use a weight in the least squares estimation with forgetting factor and weight as the gain.

Furthermore, the measurement amount may be an estimation value of an angular velocity of the operation unit. In that case, the change means may use a convergence gain used in calculating an estimation value of the angular velocity as the gain.

Alternatively, the measurement amount may be an estimation value of an elastic deformation angular velocity of the elastic body.

The present invention also provides a vibration suppression method that suppresses vibration of an operation unit in a mechanical system having a natural vibration mode including the operation unit, an actuator unit that operates the operation unit, and an elastic body that couples the operation unit and the actuator unit, the vibration suppression method including a step of estimating a measurement amount related to the mechanical system with changing a gain so that an influence of an increase in a modeling error becomes small in a period in which the modeling error of the mechanical system increases, and without changing the gain except for the period, and a step of correcting a drive signal for driving the actuator unit on the basis of the measurement amount having been estimated.

Furthermore, the present invention also provides a program that causes a computer to function as a vibration suppression device that suppresses vibration of an operation unit in a mechanical system having a natural vibration mode including the operation unit, an actuator unit that operates the operation unit, and an elastic body that couples the operation unit and the actuator unit, the program causing the computer to function as a generation means for generating a drive signal for driving the actuator unit, an estimation means for estimating a measurement amount related to the mechanical system, a correction means for correcting the drive signal generated by the generation means on the basis of the measurement amount estimated by the estimation means, and a change means for changing a gain used by the estimation means so that an influence of an increase in a modeling error becomes small in a period in which the modeling error of the mechanical system increases.

According to the present invention, it is possible to reduce the possibility of erroneous vibration suppression due to a modeling error of a mechanical system.

MODE FOR CARRYING OUT THE INVENTION

Embodiments of the present invention will be described below in detail with reference to the accompanying drawings.

Background of Present Embodiment

Figure 1:
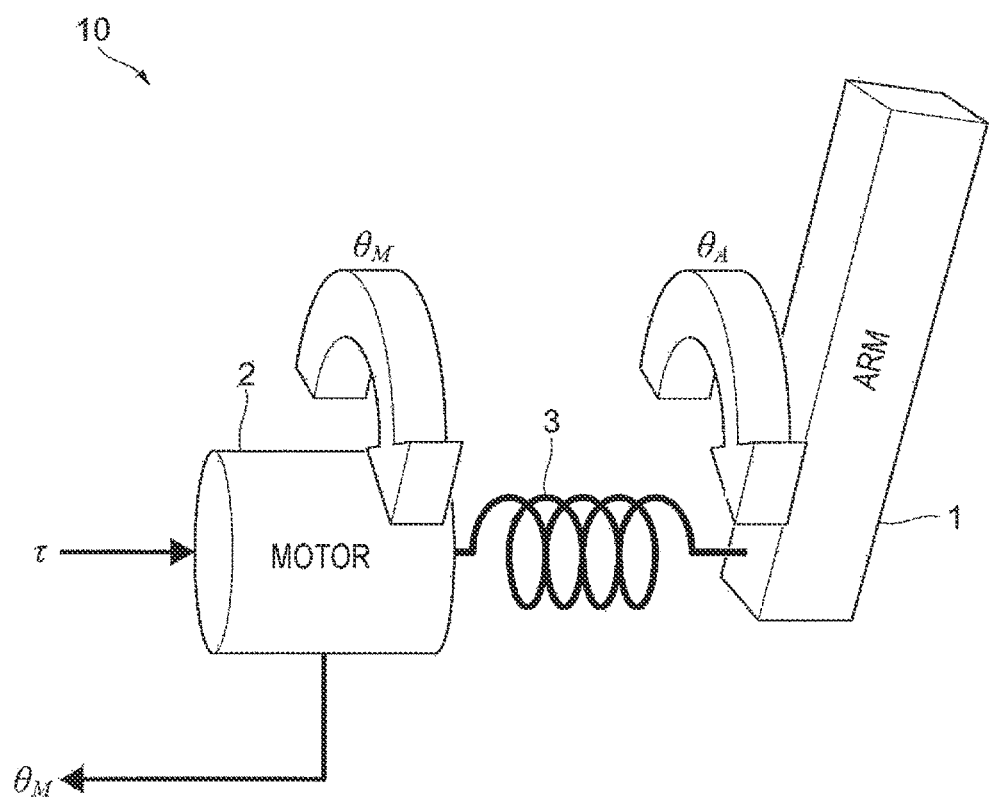
FIG. 1 is view showing a configuration of a mechanical system 10 to which the present embodiment is applied.

FIG. 1 is view showing a configuration of the mechanical system 10 to which the present embodiment is applied. As illustrated, the mechanical system 10 is a mechanical system having a natural vibration mode configured by combining an arm 1 and a motor 2 by an elastic body 3 such as a speed reducer. The rotation angle of the arm 1 is represented by $\theta_A$, the rotation angle of the motor 2 is represented by $\theta_M$, and the command torque to the motor 2 is represented by $\tau$. The rotation angle $\theta_M$ is returned from the motor 2. Here, the arm 1 is an example of an operation unit, the motor 2 is an example of an actuator unit, and the command torque $\tau$ to the motor 2 is an example of a drive signal for driving the actuator unit. The command torque $\tau$ and the rotation angle $\theta_M$ will hereinafter be referred to as actuator information. At this time, the equation of motion of the mechanical system 1 is given by the following equation.

$$\frac{d}{dt}\begin{bmatrix}\dot{\theta}_A \\ \varepsilon \\ \dot{\theta}_M\end{bmatrix} = \begin{bmatrix}0 & -K/J_A & 0 \\ 1 & 0 & -1 \\ 0 & K/J_M & 0\end{bmatrix} \cdot \begin{bmatrix}\dot{\theta}_A \\ \varepsilon \\ \dot{\theta}_M\end{bmatrix} + \begin{bmatrix}-f_A(\dot{\theta}_A)/J_A \\ 0 \\ -f_M(\dot{\theta}_M)/J_M\end{bmatrix} + \begin{bmatrix}0 & 1/J_A \\ 0 & 0 \\ 1/J_M & 0\end{bmatrix} \cdot \begin{bmatrix}\tau \\ f\end{bmatrix} \quad [\text{Eq. 1}]$$

$$\dot{\theta}_M = [0\ 0\ 1] \cdot \begin{bmatrix}\dot{\theta}_A \\ \varepsilon \\ \dot{\theta}_M\end{bmatrix}$$

In this equation, the natural frequency of the arm 1 becomes $\sqrt{(K/J_A)}$. $J_A$ is the inertia of the arm 1 (hereinafter referred to as "arm inertia"), $J_M$ is the inertia of the motor 2 (hereinafter referred to as "motor inertia"), K is the rigidity of the elastic body 3, $f_A$ is the frictional force of the arm 1 (hereinafter referred to as "arm frictional force"), $f_M$ is the frictional force of the motor 2 (hereinafter referred to as "motor frictional force"), f is the excitation force acting on the arm 1, and $\varepsilon$ is elastic deformation ($=\theta_A-\theta_M$). Note that in the equations and drawings of the description, "·" given directly above the character represents the first-order differential of time, and "··" given directly above the character represents the second-order differential of time. On the other hand, in the text of the description, the first-order differential of time is represented by "d/dt" and the second-order differential of time is represented by "d²/dt²".

Here, as an existing technology, it is conceivable to configure a disturbance observer, to filter its output to extract the vibration torque component, and to correct the drive signal by open-loop control.

In a well-controlled robot or the like, the vibration torque component in the drive signal is minute in general, and is easily affected by a modeling error. In particular, when the robot or the like is performing a micromotion, the influence of the frictional force becomes dominant, and the frictional force drastically changes at the time of the turning back operation. In that case, the occurring modeling error dramatically increases, and the included frequency components include a variety of high frequency components.

When the existing technology is applied in such a situation, the output of the disturbance observer is greatly affected by the modeling error due to the frictional force at the time of turning back, and even if an attempt is made to extract the vibration torque component by filter processing, an erroneous component is extracted. In particular, if the phase is shifted by 90° or more, the vibration suppression effect is lost, and on the contrary, there is a possibility that the vibration is excited. Due to the influence of the modeling error described above, a phase shift of 90° or more with respect to the true value occurs in the vibration torque component estimated by the existing technology, which results in vibration on the contrary. That is, at the time of turning back, the modeling error component becomes far larger than the vibration torque component, and the control is performed on the basis of an erroneous estimation result by the existing technology.

Figure 2:
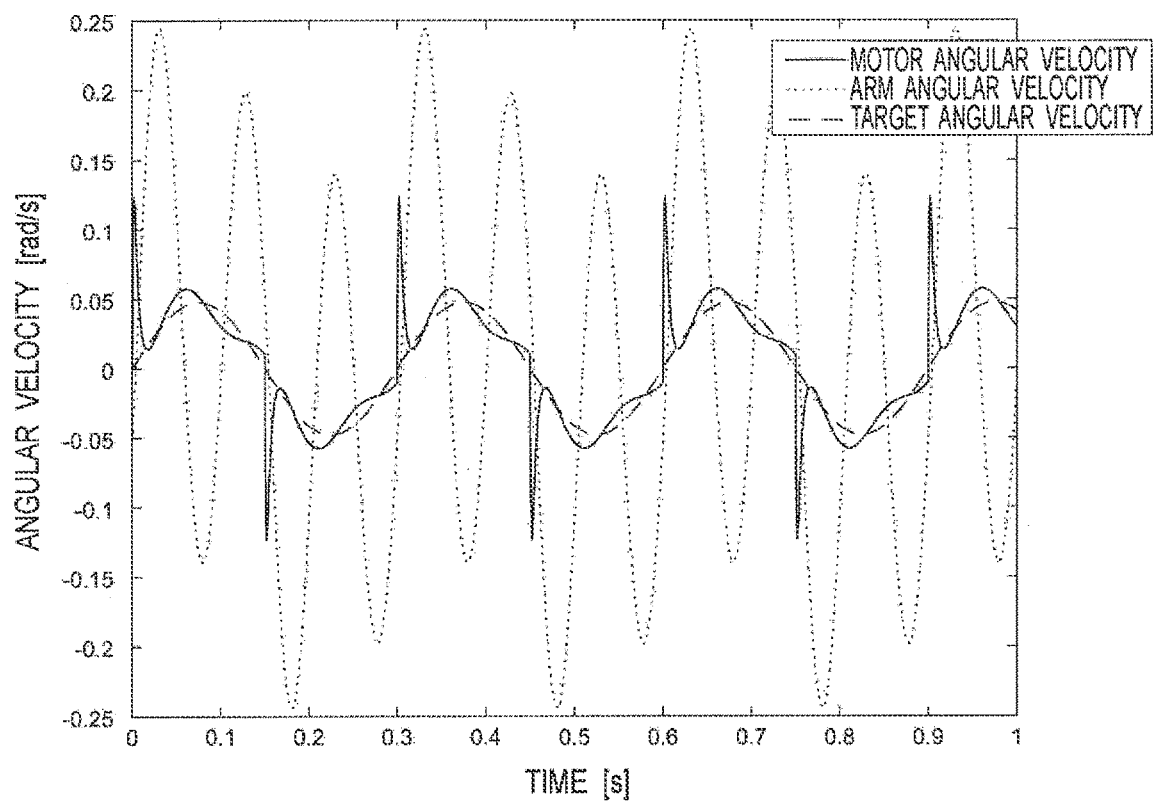
FIG. 2 is a graph showing a simulation result of a vibration behavior in the case of not performing vibration suppression among vibration behaviors at the time of micromotion.
Figure 3:
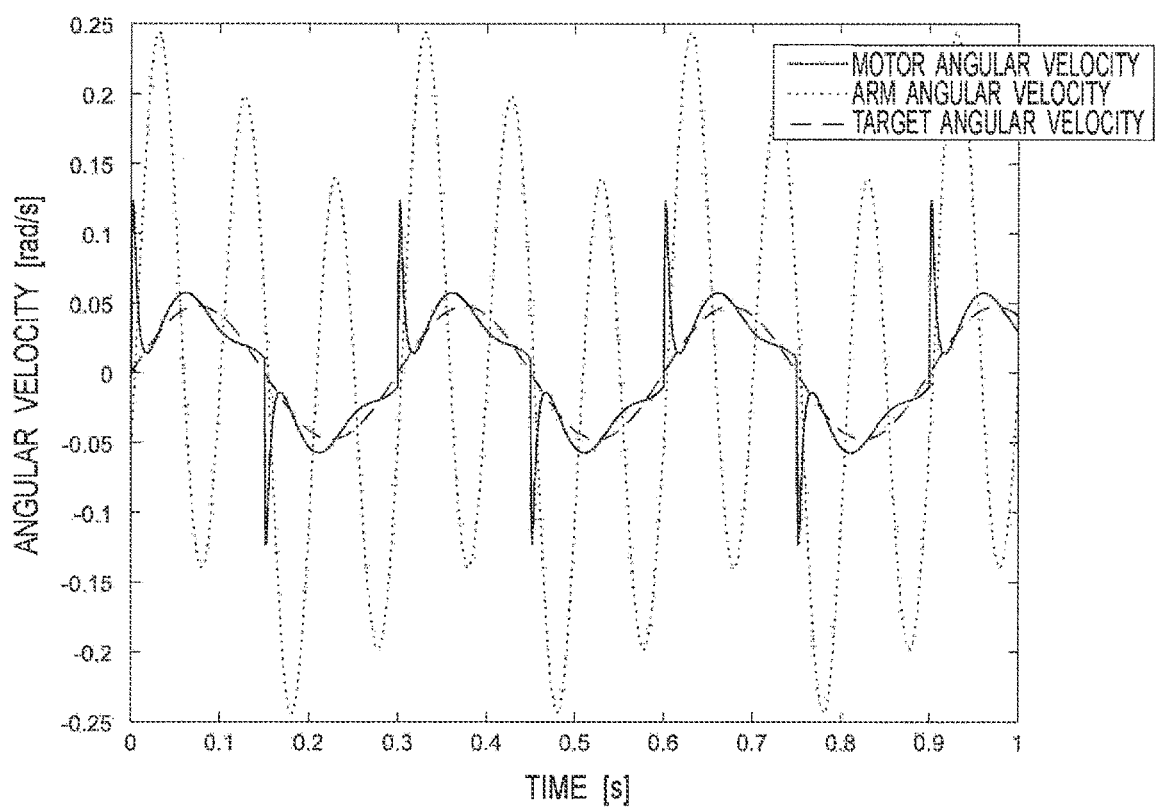
FIG. 3 is a graph showing a simulation result of a vibration behavior in the case of performing vibration suppression by an existing technology among vibration behaviors at the time of micromotion.

FIG. 2 and FIG. 3 are graphs showing simulation results of vibration behaviors at the time of micromotion. Of them, FIG. 2 shows a vibration behavior in the case of not performing vibration suppression, and FIG. 3 shows a vibration behavior in the case of performing vibration suppression by an existing technology. These figures indicate that the vibration is not suppressed at all by the existing technology.

Note that FIG. 3 shows a simulation result in the case where an excitation force f does not act, but in the case where the excitation force f acts, there is a possibility that the phase shifts due to the influence of the modeling error and the vibration becomes redundant in the existing technology on the contrary.

Therefore, in the present embodiment, the influence of the modeling error is reduced by reducing the gain of the estimation unit in a place where the modeling error (includes high frequency components in particular) is large. Specifically, the influence of the modeling error is reduced by reducing the convergence gain of the observer or the weight in the least squares estimation in a period before and after the direction of the motor angular velocity is inverted, in which the modeling error of the frictional force changes dramatically.

First Embodiment

Figure 4:
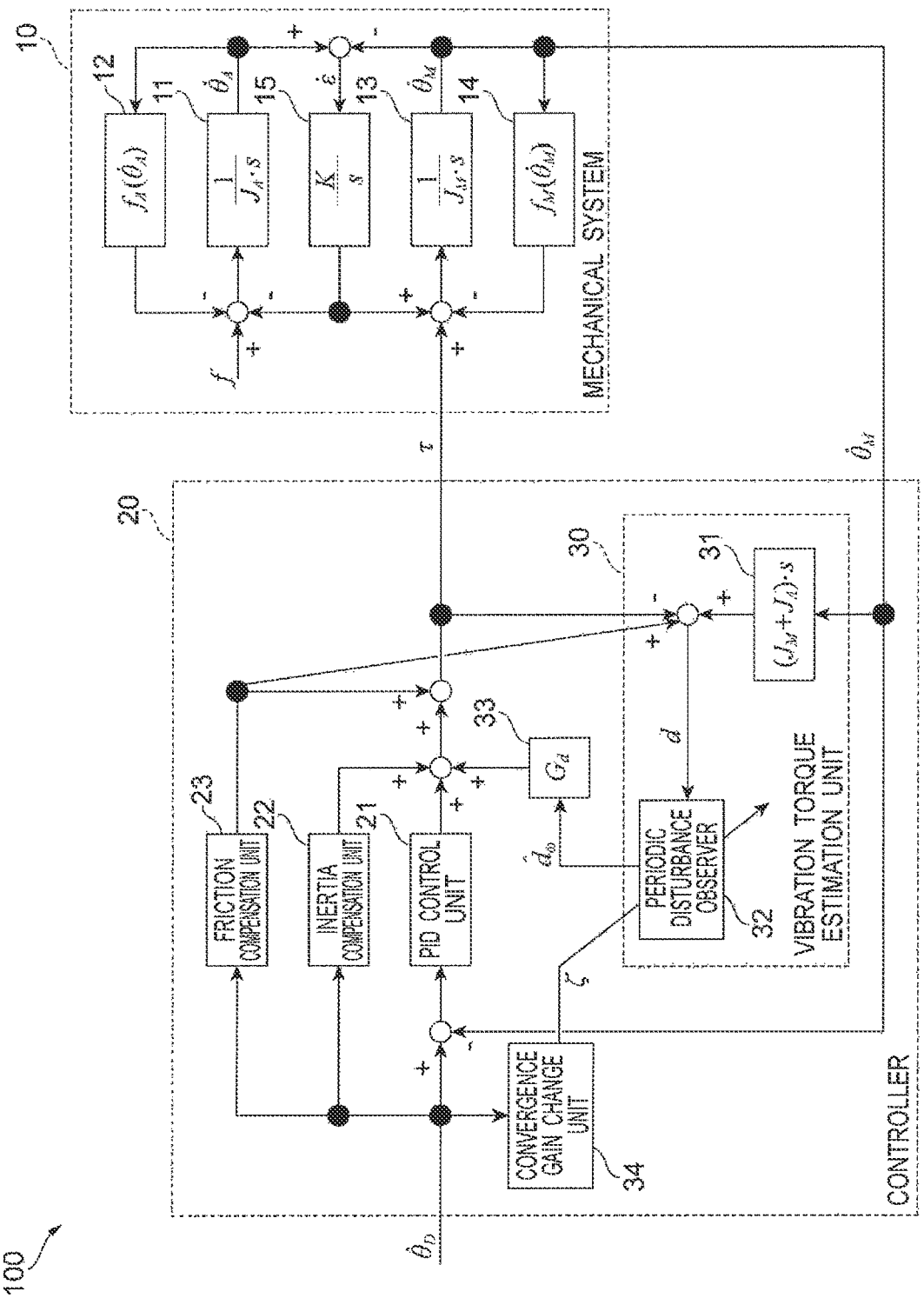
FIG. 4 is a block diagram showing a configuration example of a mechanical control system according to a first embodiment.

FIG. 4 is a block diagram showing a configuration example of a mechanical control system 100 according to the first embodiment. As illustrated, the mechanical control system 100 includes the mechanical system 10 and a controller 20 that controls the mechanical system 10. In the controller 20, for example, a CPU (not illustrated) reads a program from a storage means (not illustrated) such as a ROM and executes the program, thereby realizing each function. In the present embodiment, the controller 20 is provided as an example of the vibration suppression device.

First, the functional configuration of the mechanical system 10 will be described.

As illustrated, the mechanical system 10 includes calculators 11 to 15.

The calculator 11 subtracts the arm frictional force $f_A$ ($d\theta_A/dt$) output by the calculator 12 from the excitation force f, and acquires the result of subtracting $K\varepsilon$ output from the calculator 15. Then, the arm angular velocity $d\theta_A/dt$ is calculated by integrating the result of dividing this by the arm inertia $J_A$, and the calculated arm angular velocity $d\theta_A/dt$ is output.

The calculator 12 acquires the arm angular velocity $d\theta_A/dt$ output from the calculator 11. Then, the arm frictional force $f_A$ ($d\theta_A/dt$) is calculated on the basis of this, and the calculated arm frictional force $f_A$ ($d\theta_A/dt$) is output.

The calculator 13 subtracts the motor frictional force $f_M$ ($d\theta_M/dt$) output by the calculator 14 from the command torque $\tau$ output by the controller 20, and acquires the result of adding $K\varepsilon$ output by the calculator 15. Then, the motor angular velocity $d\theta_M/dt$ is calculated by integrating the result of dividing this by the motor inertia $J_M$, and the calculated motor angular velocity $d\theta_M/dt$ is output.

The calculator 14 acquires the motor angular velocity $d\theta_M/dt$ output by the calculator 13. Then, the motor frictional force $f_M$ ($d\theta_M/dt$) is calculated on the basis of this, and the calculated motor frictional force $f_M$ ($d\theta_M/dt$) is output.

The calculator 15 acquires an elastic deformation speed $d\varepsilon/dt$ obtained by subtracting the motor angular velocity $d\theta_M/dt$ output by the calculator 13 from the arm angular velocity $d\theta_A/dt$ output by the calculator 11. Then, $K\varepsilon$ is calculated by integrating the result of multiplying this by a rigidity K, and the calculated $K\varepsilon$ is output.

Next, the functional configuration of the controller 20 will be described.

As illustrated, the controller 20 includes a PID control unit 21, an inertia compensation unit 22, and a friction compensation unit 23.

The PID control unit 21 acquires the result of subtracting the motor angular velocity $d\theta_M/dt$ fed back from the mechanical system 10 from a target angular velocity of the motor 2 (hereinafter referred to as "target angular velocity") $d\theta_D/dt$ indicated to the controller 20. Then, by performing PID control to this, the PID control unit 21 outputs feedback torque.

The inertia compensation unit 22 acquires the target angular velocity $d\theta_D/dt$ indicated to the controller 20. Then, the inertia compensation unit 22 calculates inertia compensation "$(\hat{J_A}+\hat{J_M})\ d^2\theta_D/dt^2$" by applying an arm inertia model and a motor inertia model to this, thereby outputting feedforward torque based on the inertia model.

The friction compensation unit 23 acquires the target angular velocity $d\theta_D/dt$ indicated to the controller 20. Then, the friction compensation unit 23 calculates friction compensation "$\hat{f_A}(d\theta_D/dt)+\hat{f_M}(d\theta_D/dt)$" by applying an arm friction model and a motor friction model to this, thereby outputting feedforward torque based on the friction model.

Note that in the equations and drawings of the description, a circumflex is given directly above the character, while in the text of the description, the circumflex is given after the character. In the present embodiment, the PID control unit 21, the inertia compensation unit 22, and the friction compensation unit 23 are provided as an example of the generation means for generating the drive signal.

The controller 20 includes a vibration torque estimation unit 30. The vibration torque estimation unit 30 acquires the motor angular velocity $d\theta_M/dt$ output by the mechanical system 10, and outputs the vibration torque estimation value $\hat{d}_\omega$, which is an estimation value of the vibration torque generated in the elastic body 3 and acting on the motor 2. Specifically, the vibration torque estimation unit 30 includes a calculation unit 31 and a periodic disturbance observer 32.

The calculation unit 31 acquires the motor angular velocity $d\theta_M/dt$ output by the mechanical system 10. Then, the inertial force is output by differentiating the result of multiplying this by the sum of the arm inertia $J_A$ and the motor inertia $J_M$.

The periodic disturbance observer 32 acquires a disturbance torque d obtained by subtracting the command torque τ to the motor 2 from the sum of the inertia force output from the calculation unit 31 and the torque based on the friction model output from the friction compensation unit 23. Then, the vibration torque estimation value $\hat{d}_\omega$ is calculated by performing filter processing for extracting only the vibration component of a natural vibration frequency ω expressed by the following equation with respect to the disturbance torque d, and the calculated vibration torque estimation value $\hat{d}_\omega$ is output.

$$\hat{d}_\omega = \frac{\zeta \cdot \omega \cdot s}{s^2 + \zeta \cdot \omega \cdot s + \omega^2} \quad \text{[Eq. 2]}$$

In the present embodiment, the vibration torque estimation value $\hat{d}_\omega$ is used as an example of the measurement amount related to the mechanical system, and the vibration torque estimation unit 30 is provided as an example of the estimation means for estimating the measurement amount.

Furthermore, the controller 20 includes a calculation unit 33. The calculation unit 33 acquires the vibration torque estimation value $\hat{d}_\omega$ output by the vibration torque estimation unit 30. Then, the vibration suppression torque is calculated by multiplying this by a feedback gain $G_d$, and the calculated vibration suppression torque is output.

Thus, the feedback torque output by the PID control unit 21 is added with the feedforward torque based on the inertia model output by the inertia compensation unit 22, and the vibration suppression torque output by the calculation unit 33 is added to the result. In that sense, the calculation unit 33 is an example of the correction means for correcting the drive signal on the basis of the measurement amount. Then, the result is added with the feedforward torque based on the friction model output by the friction compensation unit 23, and the result becomes the command torque τ to the motor 2.

In the first embodiment, the controller 20 includes a convergence gain change unit 34 in addition to these components. By modifying ξ corresponding to the convergence gain of the filter used in the periodic disturbance observer 32 in accordance with the target angular velocity $d\theta_D/dt$ indicated to the controller 20, the convergence gain change unit 34 becomes not affected by the time of turning back in which the modeling error including a high frequency component increases. Specifically, the convergence gain ξ is only required to be made small when the target angular velocity $d\theta_D/dt$ is small. Hereinafter, the influence of the modeling error is eliminated by setting the convergence gain ξ to 0 when the absolute value of the target angular velocity $d\theta_D/dt$ becomes 0.01 rad/s or less. In the present embodiment, a time in which the target angular velocity $d\theta_D/dt$ becomes small is used as an example of a period in which the modeling error of the mechanical system increases, the convergence gain ξ is used as an example of a gain used in the estimation means, and the convergence gain change unit 34 is provided as an example of the change means for changing the gain so that the influence of an increase in the modeling error becomes small in a period in which the modeling error of the mechanical system increases.

Figure 5A:
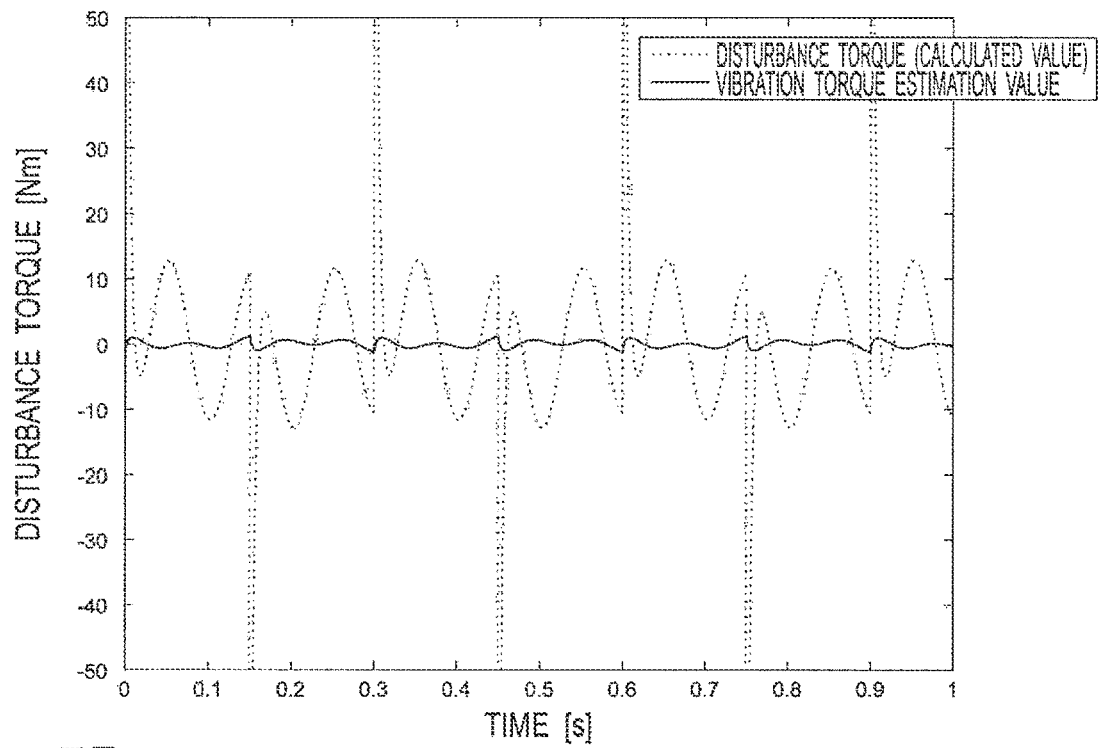
FIG. 5(a) is a graph showing a disturbance estimation result in a periodic disturbance observer of an existing technology.
Figure 5B:
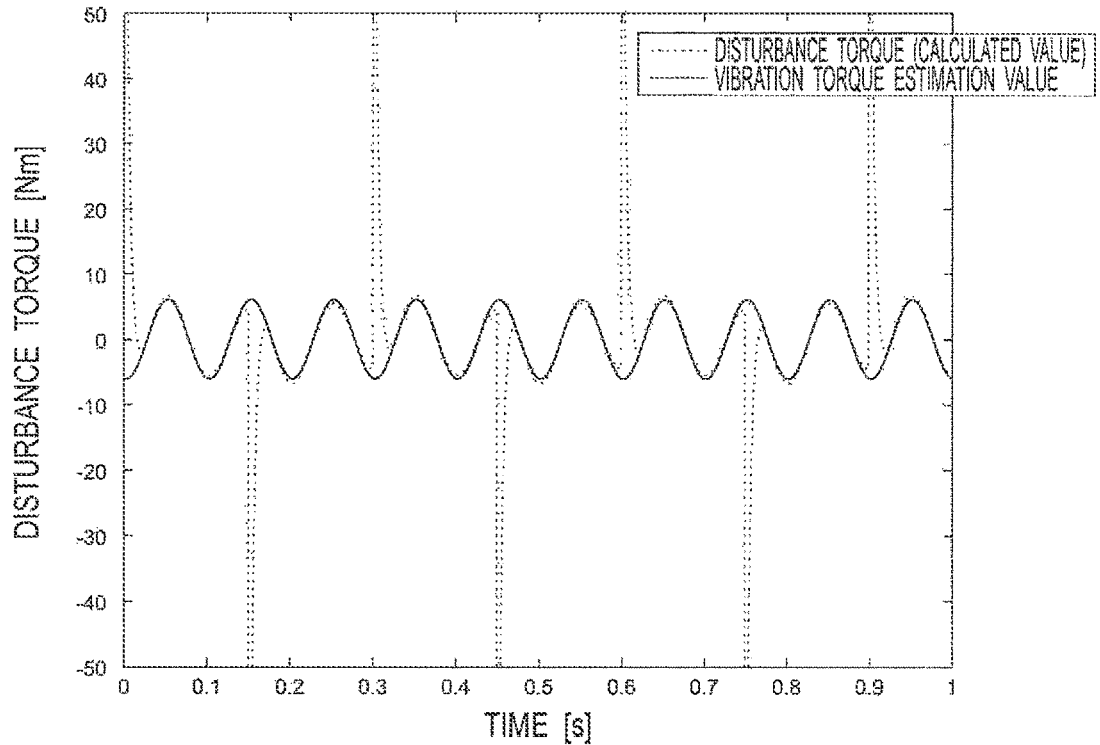
FIG. 5(b) is a graph showing a disturbance estimation result in a periodic disturbance observer of the first embodiment.

FIG. 5(a) is a graph showing a disturbance estimation result in the periodic disturbance observer 32 of an existing technology, and FIG. 5(b) is a graph showing a disturbance estimation result in the periodic disturbance observer 32 of the first embodiment. FIGS. 5(a) and 5(b) indicate that the existing technology is not capable of estimating the excitation force at all due to the influence of the modeling error, whereas in the first embodiment, the excitation force is estimated accurately.

Figure 6:
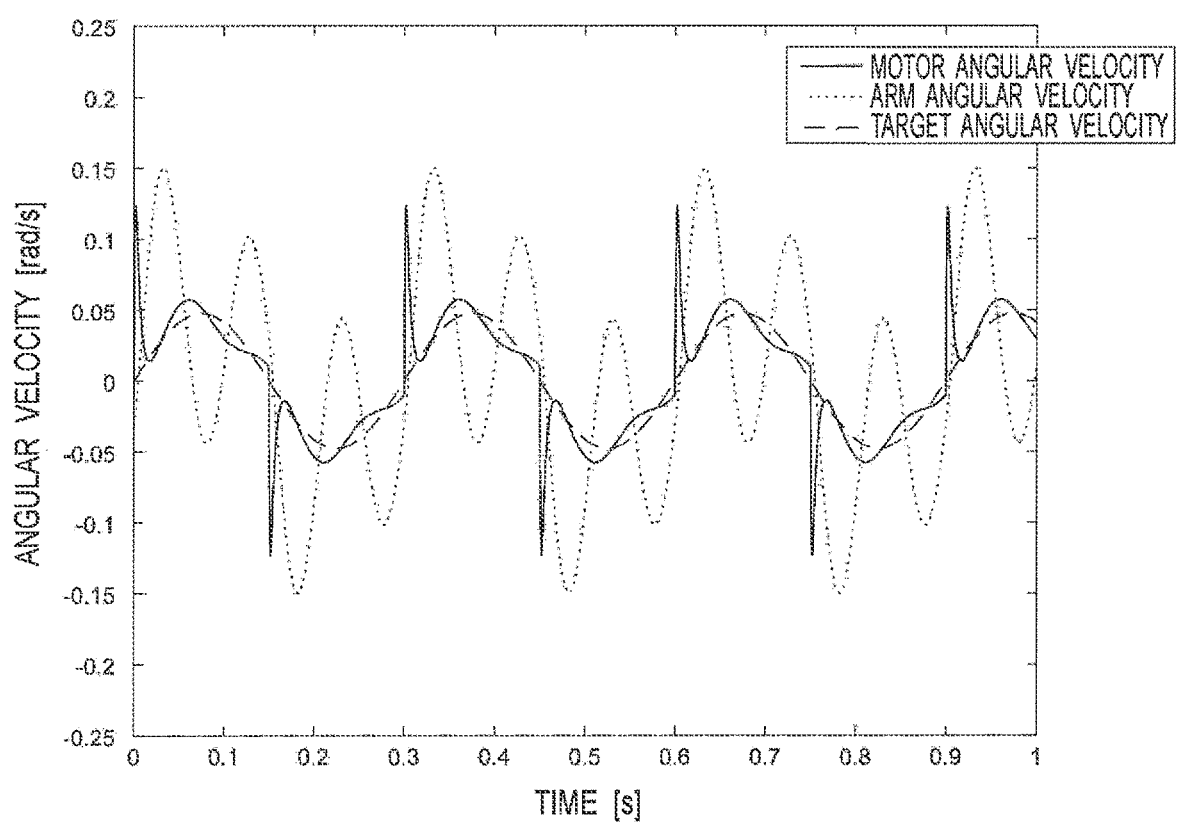
FIG. 6 is a graph showing a result of performing positive feedback of a vibration torque estimation value $d_\omega\hat{}$ with a feedback gain $G_d$ set to 1.

FIG. 6 is a graph showing a result of performing positive feedback of the vibration torque estimation value $\hat{d}_\omega$ with the feedback gain $G_d$ set to 1, and performing resonance ratio control so as to be defeated by the disturbance. FIG. 6 indicates that the vibration is suppressed to ½ as compared with the case without the vibration suppression shown in FIG. 2.

Figure 7:
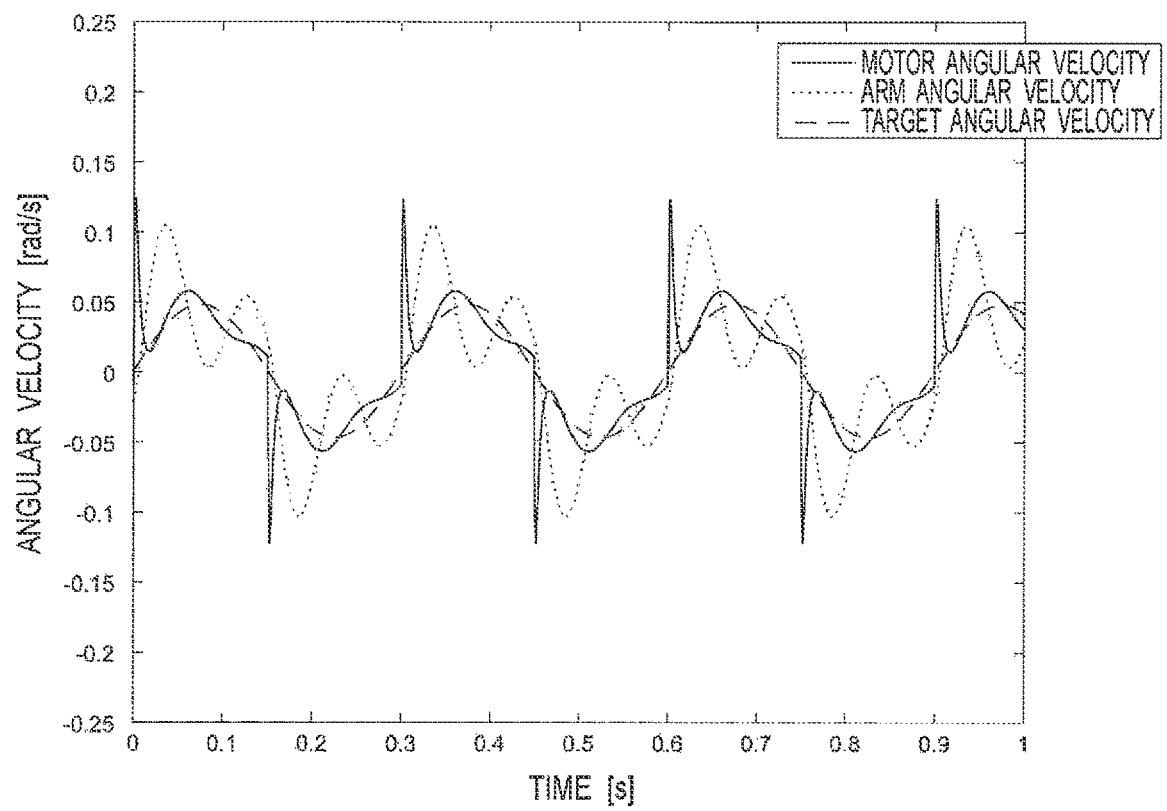
FIG. 7 is a graph showing a result of performing positive feedback of the vibration torque estimation value $d_\omega\hat{}$ with the feedback gain $G_d$ set to 3.
Figure 8:
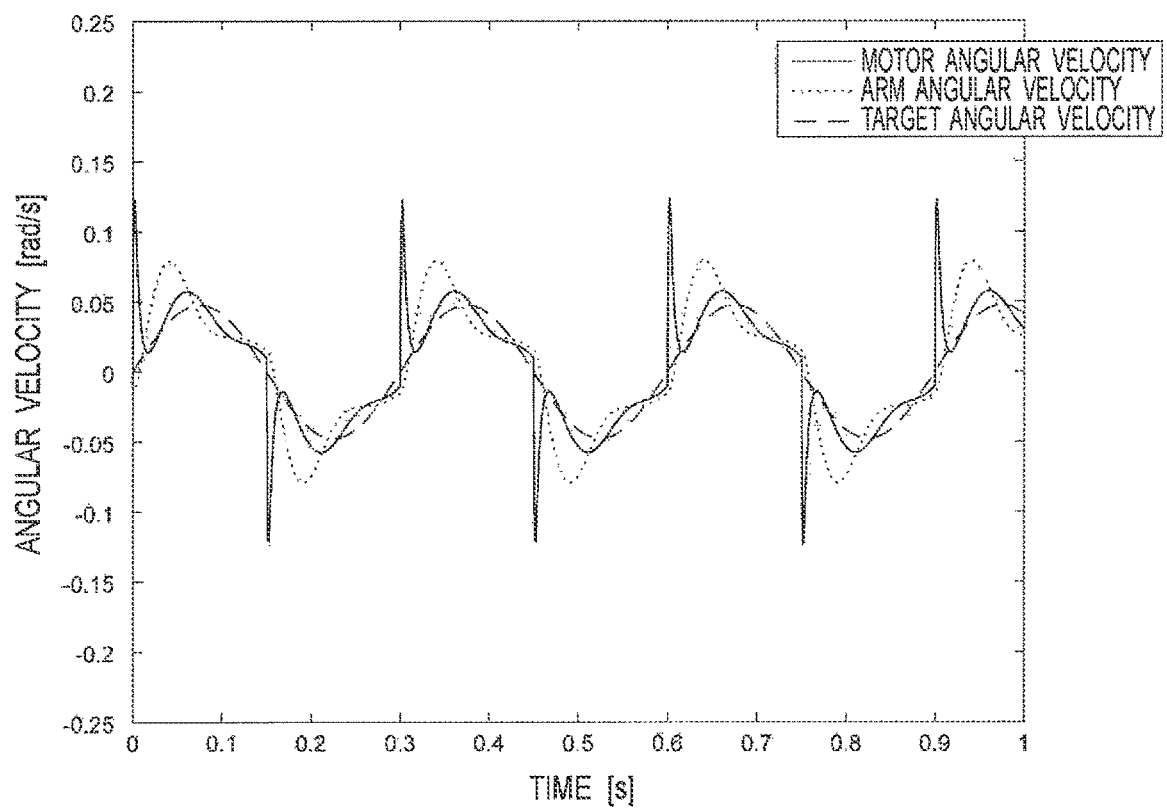
FIG. 8 is a graph showing a result of performing positive feedback of the vibration torque estimation value $d_\omega\hat{}$ with the feedback gain Ga set to 10.

Furthermore, FIG. 7 and FIG. 8 are graphs showing results of performing positive feedback of the vibration torque estimation value $\hat{d}_\omega$ with an increased feedback gain and performing resonance ratio control. FIG. 7 indicates that the vibration is successfully suppressed to about ¼ when the feedback gain $G_d$ is set to 3, and FIG. 8 indicates that the vibration is successfully suppressed to about ¹⁄₁₁ when the feedback gain $G_d$ is set to 10.

Figure 9:
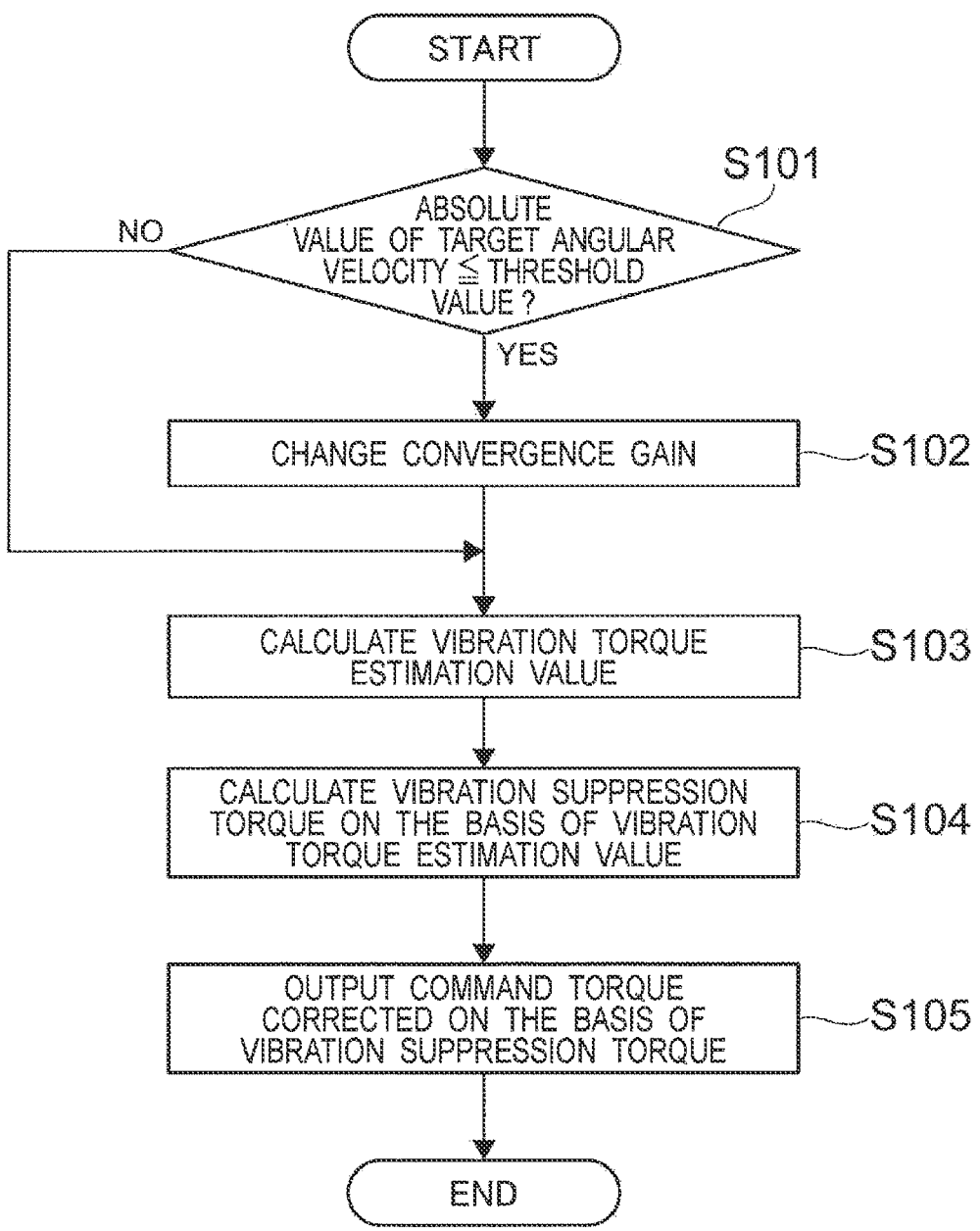
FIG. 9 is a flowchart showing an operation example of a convergence gain change unit, a periodic disturbance observer, and the like of a controller according to the first embodiment.

FIG. 9 is a flowchart showing an operation example of the convergence gain change unit 34, the periodic disturbance observer 32, the calculation unit 33, and the like of the controller 20 according to the first embodiment.

As illustrated, in the controller 20, the convergence gain change unit 34 determines whether or not the absolute value of the target angular velocity $d\theta_D/dt$ indicated to the controller 20 is equal to or less than a threshold value (0.01 rad/s, for example) (Step 101). If it is determined that the absolute value of the target angular velocity $d\theta_D/dt$ is equal to or less than the threshold value, the convergence gain change unit 34 changes the convergence gain ξ in the periodic disturbance observer 32 (Step 102).

Next, the periodic disturbance observer 32 performs filter processing for extracting only the vibration component of the natural vibration frequency ω with respect to the disturbance torque d, thereby calculating the vibration torque estimation value $\hat{d}_\omega$ (Step 103). That is, if the convergence gain ξ has been changed in Step 102, the vibration torque estimation value $\hat{d}_\omega$ is calculated using the changed convergence gain ξ. On the other hand, if the convergence gain ξ has not been changed, the vibration torque estimation value $\hat{d}_\omega$ is calculated using the convergence gain ξ of the default value.

Next, the calculation unit 33 calculates the vibration suppression torque on the basis of the vibration torque estimation value $\hat{d}_\omega$ calculated in Step 103 (Step 104).

Thus, the controller 20 outputs, to the motor 2, the command torque τ corrected on the basis of the vibration suppression torque calculated in Step 104 (Step 105).

Second Embodiment

In the first embodiment, the periodic disturbance observer 32 is used to estimate the vibration torque estimation value $d_\omega\hat{}$, but in the second embodiment, a similar result is obtained by using an estimation unit that performs the least squares estimation with forgetting factor and weight (hereinafter referred to as "least squares estimation unit").

Figure 10:
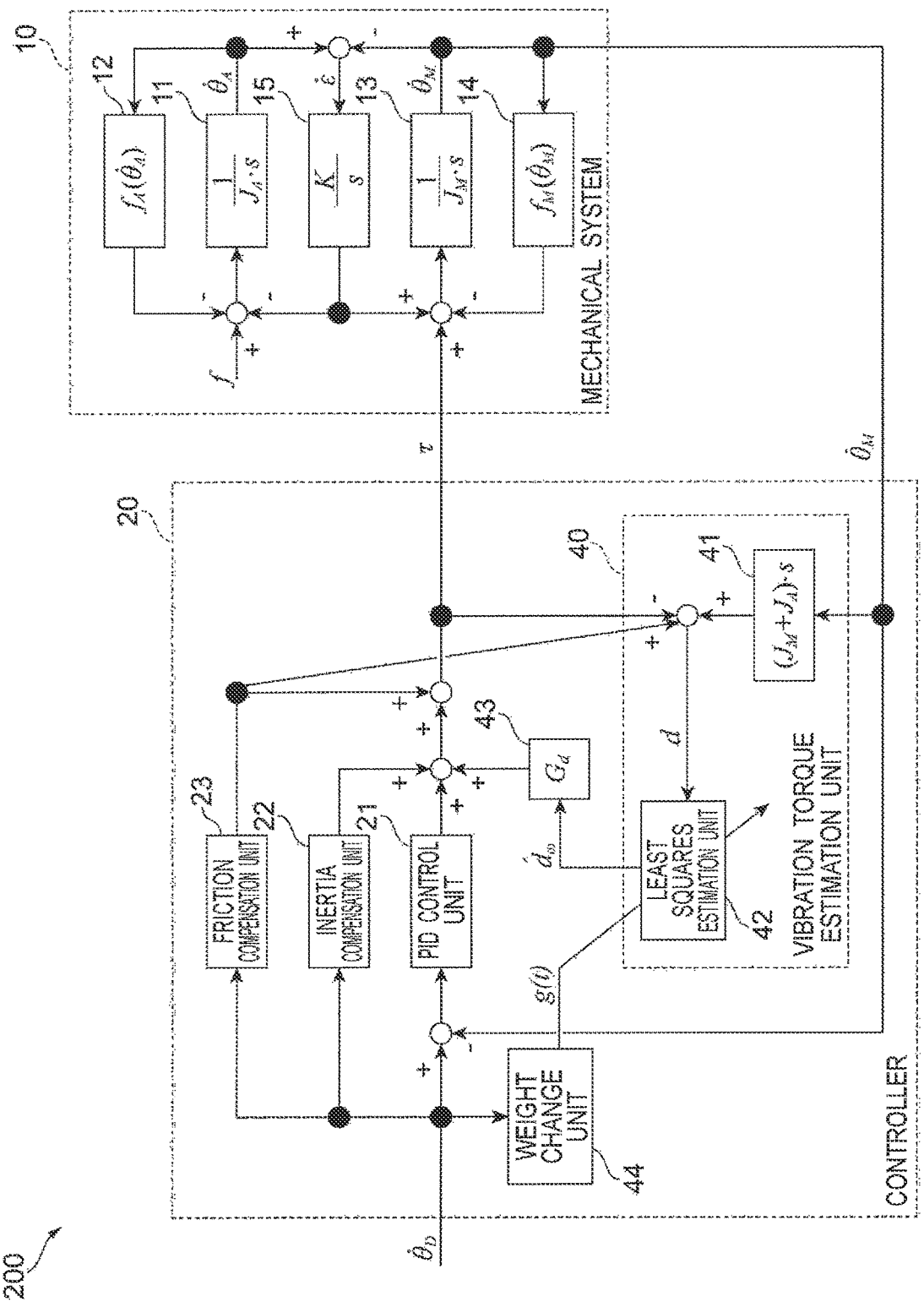
FIG. 10 is a block diagram showing a configuration example of a mechanical control system according to a second embodiment.

FIG. 10 is a block diagram showing a configuration example of a mechanical control system 200 according to the second embodiment. As illustrated, the mechanical control system 200 includes the mechanical system 10 and the controller 20 that controls the mechanical system 10. In the controller 20, for example, a CPU (not illustrated) reads a program from a storage means (not illustrated) such as a ROM and executes the program, thereby realizing each function. In the present embodiment, the controller 20 is provided as an example of the vibration suppression device.

Since the functional configuration of the mechanical system 10 is similar to that described in the first embodiment, the description thereof is omitted.

Next, the functional configuration of the controller 20 will be described.

As illustrated, the controller 20 includes a PID control unit 21, an inertia compensation unit 22, and a friction compensation unit 23. Since these configurations are similar to those described in the first embodiment, the description thereof is omitted.

The controller 20 includes a vibration torque estimation unit 40. Similarly to the vibration torque estimation unit 30 in the first embodiment, the vibration torque estimation unit 40 acquires the motor angular velocity $d\theta_M/dt$ output by the mechanical system 10, and outputs the vibration torque estimation value $d_\omega\hat{}$, which is an estimation value of the vibration torque generated in the elastic body 3 and acting on the motor 2. Specifically, the vibration torque estimation unit 40 includes a calculation unit 41 and a least squares estimation unit 42.

The calculation unit 41 acquires the motor angular velocity $d\theta_M/dt$ output by the mechanical system 10. Then, the inertial force is output by differentiating the result of multiplying this by the sum of the arm inertia $J_A$ and the motor inertia $J_M$.

The least squares estimation unit 42 acquires a disturbance torque d obtained by subtracting the command torque τ to the motor 2 from the sum of the inertia force output from the calculation unit 41 and the torque based on the friction model output from the friction compensation unit 23. Then, the vibration torque estimation value $d_\omega\hat{}$ is calculated by performing the least squares estimation with forgetting factor and weighted expressed by the following equation with respect to the disturbance torque d, and the calculated vibration torque estimation value $d_\omega\hat{}$ is output.

$$\begin{bmatrix} \vdots \\ g(t_{N-n}) \cdot \rho^{t_N - t_{N-n}} \cdot [\sin(\omega \cdot t_{N-n}) \ \cos(\omega \cdot t_{N-n})] \\ \vdots \\ g(t_N) \cdot \rho^{t_N - t_N} \cdot [\sin(\omega \cdot t_N) \ \cos(\omega \cdot t_N)] \end{bmatrix} \begin{bmatrix} a_{sin} \\ a_{cos} \end{bmatrix} = $$
[Eq. 3]

$$\begin{bmatrix} \vdots \\ g(t_{N-n}) \cdot \rho^{t_N - t_{N-n}} \cdot d(t_{N-n}) \\ \vdots \\ g(t_N) \cdot \rho^{t_N - t_N} \cdot d(t_N) \end{bmatrix}$$

$$A(t_N) \begin{bmatrix} a_{sin} \\ a_{cos} \end{bmatrix} = B(t_N)$$

$$\begin{bmatrix} \hat{a}_{sin} \\ \hat{a}_{cos} \end{bmatrix} = \left( A(t_N)^T \cdot A(t_N) \right)^{-1} \cdot A(t_N)^T \cdot B(t_N)$$

$$\hat{d}_\omega(t) = [\sin(\omega \cdot t) \ \cos(\omega \cdot t)] \begin{bmatrix} \hat{a}_{sin} \\ \hat{a}_{cos} \end{bmatrix}$$

where g(t) is the weight at time t, ρ is the forgetting coefficient, and d(t) is the raw disturbance value at the time t.

In the present embodiment, the vibration torque estimation value $d_\omega\hat{}$ is used as an example of the measurement amount related to the mechanical system, and the vibration torque estimation unit 40 is provided as an example of the estimation means for estimating the measurement amount.

Furthermore, the controller 20 includes a calculation unit 43. The calculation unit 43 acquires the vibration torque estimation value $d_\omega\hat{}$ output by the vibration torque estimation unit 40. Then, the vibration suppression torque is calculated by multiplying this by a feedback gain $G_d$, and the calculated vibration suppression torque is output.

Thus, the feedback torque output by the PID control unit 21 is added with the feedforward torque based on the inertia model output by the inertia compensation unit 22, and the vibration suppression torque output by the calculation unit 43 is added to the result. In that sense, the calculation unit 43 is an example of the correction means for correcting the drive signal on the basis of the measurement amount. Then, the result is added with the feedforward torque based on the friction model output by the friction compensation unit 23, and the result becomes the command torque τ to the motor 2.

In the second embodiment, the controller 20 includes a weight change unit 44 in addition to these components. The weight change unit 44 changes the weight g(t) of the equation used in the least squares estimation unit 42 in accordance with the target angular velocity $d\theta_D/dt$ indicated to the controller 20, thereby obtaining a similar result to that in the first embodiment. Specifically, the weight g(t) is only required to be made small when the target angular velocity $d\theta_D/dt$ is small. Similar graphs to those in FIG. 5 to FIG. 8 can be obtained also in the second embodiment, and in these graphs, the influence of the modeling error is eliminated by setting the weight g(t) to 0 when the absolute value of the target angular velocity $d\theta_D/dt$ becomes 0.01 rad/s or less. In the present embodiment, a time in which the target angular velocity $d\theta_D/dt$ becomes small is used as an example of a period in which the modeling error of the mechanical system increases, the weight g(t) is used as an example of a gain used in the estimation means, and the weight change unit 44 is provided as an example of the change means for changing the gain so that the influence of an increase in the modeling error becomes small in a period in which the modeling error of the mechanical system increases.

Figure 11:
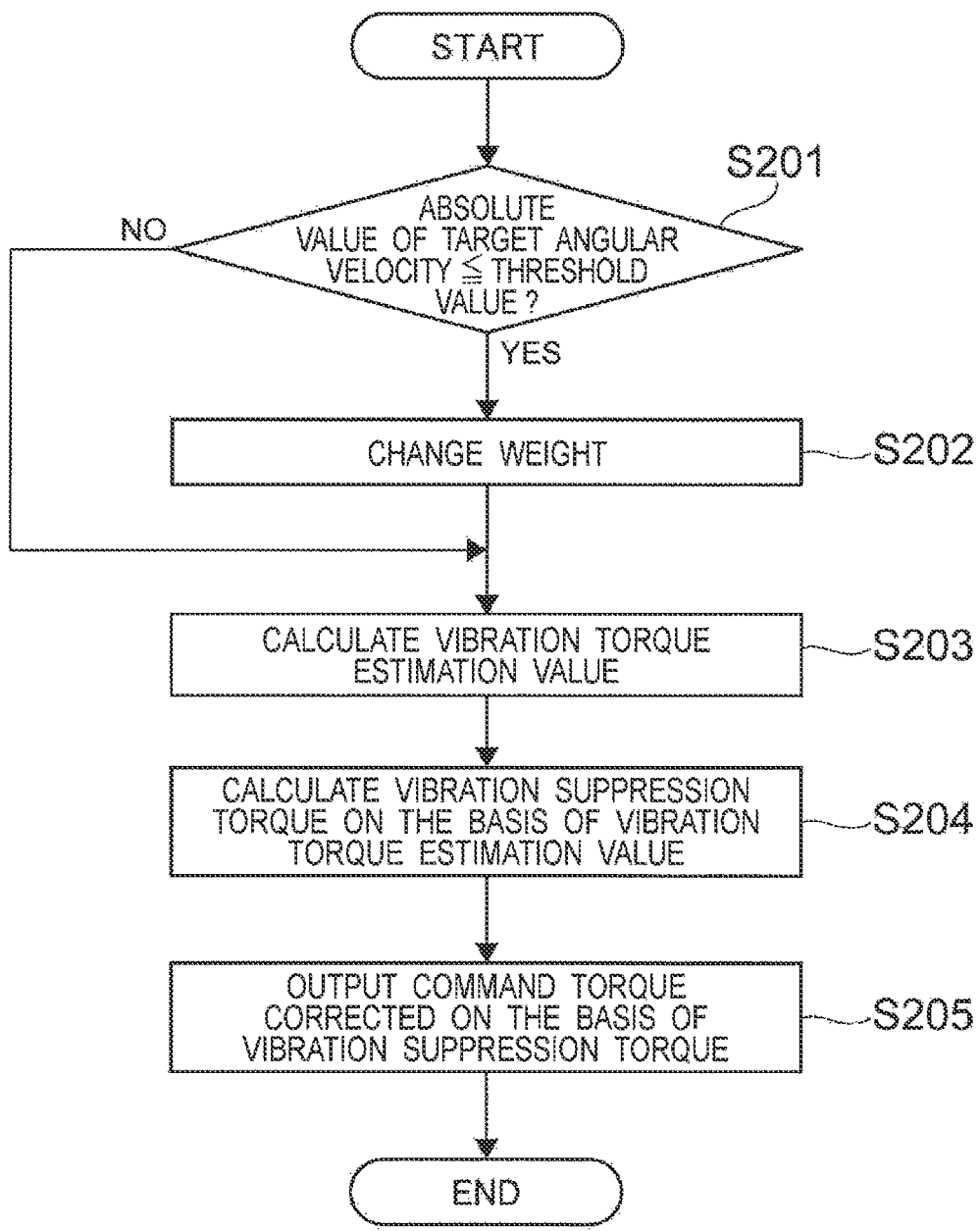
FIG. 11 is a flowchart showing an operation example of a weight change unit, a least squares estimation unit, and the like of the controller according to the second embodiment.

FIG. 11 is a flowchart showing an operation example of the weight change unit 44, the least squares estimation unit 42, the calculation unit 43, and the like of the controller 20 according to the second embodiment.

As illustrated, in the controller 20, the weight change unit 44 determines whether or not the absolute value of the target angular velocity $d\theta_D/dt$ indicated to the controller 20 is equal to or less than a threshold value (0.01 rad/s, for example) (Step 201). If it is determined that the absolute value of the target angular velocity $d\theta_D/dt$ is equal to or less than the threshold value, the weight change unit 44 changes the weight g(t) in the least squares estimation unit 42 (Step 202).

Next, the least squares estimation unit 42 performs least squares estimation with forgetting factor and weight with respect to the disturbance torque d, thereby calculating the vibration torque estimation value $d_\omega\hat{}$ (Step 203). That is, if the weight g(t) has been changed in Step 202, the vibration torque estimation value $d_\omega\hat{}$ is calculated using the changed weight g(t). On the other hand, if the weight g(t) has not been changed, the vibration torque estimation value $d_\omega\hat{}$ is calculated using the weight g(t) of the default value.

Next, the calculation unit 43 calculates the vibration suppression torque on the basis of the vibration torque estimation value $d_\omega\hat{}$ calculated in Step 203 (Step 204).

Thus, the controller 20 outputs, to the motor 2, the command torque τ corrected on the basis of the vibration suppression torque calculated in Step 204 (Step 205).

Third Embodiment

In the first and second embodiments, the vibration is suppressed by resonance ratio control that controls the vibration so as to be defeated by the estimated vibration torque, but in the third embodiment, a similar vibration suppression effect is obtained by performing negative feedback to the differential value of the vibration torque. In this case, the vibration torque estimation value that is the output of the periodic disturbance observer may be differentiated and fed back, or a periodic disturbance speed observer that outputs the estimation value of the differential value of the vibration torque (hereinafter referred to as "vibration torque differential value estimation value") may be configured and the vibration torque differential value estimation value may be fed back.

Figure 12:
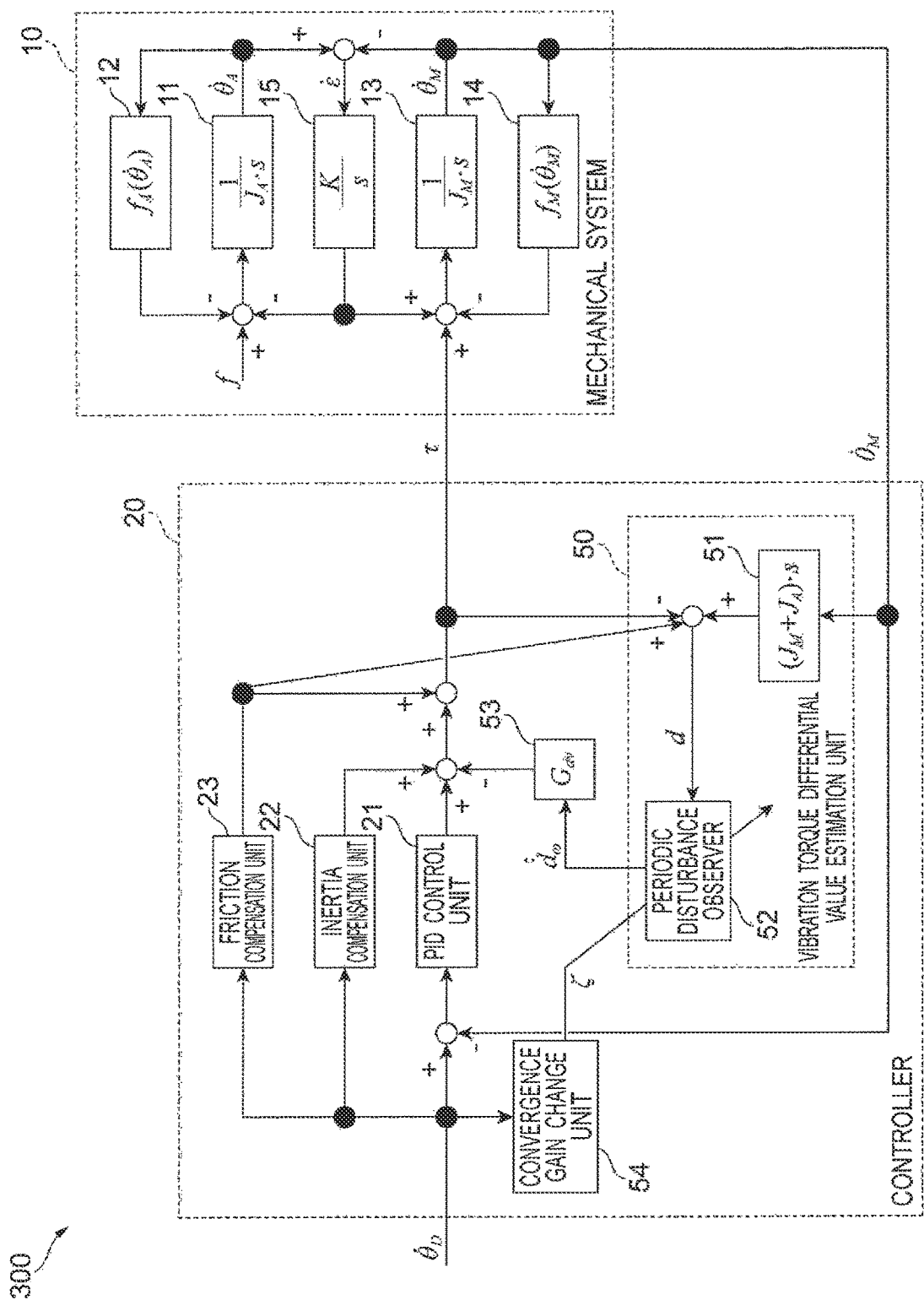
FIG. 12 is a block diagram showing a configuration example in a case where a periodic disturbance speed observer of the mechanical control system according to a third embodiment is configured.

FIG. 12 is a block diagram showing a configuration example in a case where the periodic disturbance speed observer of a mechanical control system 300 according to the third embodiment is configured. As illustrated, the mechanical control system 300 includes the mechanical system 10 and the controller 20 that controls the mechanical system 10. In the controller 20, for example, a CPU (not illustrated) reads a program from a storage means (not illustrated) such as a ROM and executes the program, thereby realizing each function. In the present embodiment, the controller 20 is provided as an example of the vibration suppression device.

Since the functional configuration of the mechanical system 10 is similar to those described in the first and second embodiments, the description thereof is omitted.

Next, the functional configuration of the controller 20 will be described.

As illustrated, the controller 20 includes a PID control unit 21, an inertia compensation unit 22, and a friction compensation unit 23. Since these configurations are similar to those described in the first and second embodiments, the description thereof is omitted.

The controller 20 includes a vibration torque differential value estimation unit 50. The vibration torque differential value estimation unit 50 acquires the motor angular velocity $d\theta_M/dt$ output by the mechanical system 10, and outputs the vibration torque differential value estimation value $(dd_\omega/dt)\hat{}$, which is an estimation value of the differential value of the vibration torque generated in the elastic body 3 and acting on the motor 2. Specifically, the vibration torque differential value estimation unit 50 includes a calculation unit 51 and a periodic disturbance speed observer 52.

The calculation unit 41 acquires the motor angular velocity $d\theta_M/dt$ output by the mechanical system 10. Then, the inertial force is output by differentiating the result of multiplying this by the sum of the arm inertia $J_A$ and the motor inertia $J_M$.

The periodic disturbance speed observer 52 acquires a disturbance torque d obtained by subtracting the command torque τ to the motor 2 from the sum of the inertia force output from the calculation unit 51 and the torque based on the friction model output from the friction compensation unit 23. Then, the vibration torque differential value estimation value $(dd_\omega/dt)\hat{}$ is calculated by performing filter processing for extracting the vibration speed component of the natural vibration frequency ω expressed by the following equation with respect to the disturbance torque d, and the calculated vibration torque differential value estimation value $(dd_\omega/dt)\hat{}$ is output.

$$\hat{d}_\omega = \frac{\zeta \cdot \omega \cdot s^2}{s^2 + \zeta \cdot \omega \cdot s + \omega^2} \quad \text{[Eq. 4]}$$

In the present embodiment, the vibration torque differential value estimation value $(dd_\omega/dt)\hat{}$ is used as an example of the measurement amount related to the mechanical system, and the vibration torque differential value estimation unit 50 is provided as an example of the estimation means for estimating the measurement amount.

Furthermore, the controller 20 includes a calculation unit 53. The calculation unit 53 acquires the vibration torque differential value estimation value $(dd_\omega/dt)\hat{}$ output by the vibration torque differential value estimation unit 50. Then, the vibration suppression torque is calculated by multiplying this by the feedback gain $G_{dv}$, and the calculated vibration suppression torque is output.

Thus, the feedback torque output by the PID control unit 21 is added with the feedforward torque based on the inertia model output by the inertia compensation unit 22, and the vibration suppression torque output by the calculation unit 53 is subtracted from the result. In that sense, the calculation unit 53 is an example of the correction means for correcting the drive signal on the basis of the measurement amount. Then, the result is added with the feedforward torque based on the friction model output by the friction compensation unit 23, and the result becomes the command torque τ to the motor 2.

In the third embodiment, the controller 20 includes a convergence gain change unit 54 in addition to these components. By modifying ξ corresponding to the convergence gain of the filter used in the periodic disturbance speed observer 52 in accordance with the target angular velocity $d\theta_0/dt$ indicated to the controller 20, the convergence gain change unit 54 becomes not affected by the time of turning back in which the modeling error including a high frequency component increases. Specifically, the convergence gain ξ is only required to be made small when the target angular velocity $d\theta_D/dt$ is small. Similar graphs to those in FIG. 6 to FIG. 8 can be obtained also in the third embodiment, and in these graphs, the influence of the modeling error is eliminated by setting the convergence gain ξ to 0 when the absolute value of the target angular velocity $d\theta_D/dt$ becomes 0.01 rad/s or less. In the present embodiment, a time in which the target angular velocity $d\theta_D/dt$ becomes small is used as an example of a period in which the modeling error of the mechanical system increases, the convergence gain ξ is used as an example of a gain used in the estimation means, and the convergence gain change unit 54 is provided as an example of the change means for changing the gain so that the influence of an increase in the modeling error becomes small in a period in which the modeling error of the mechanical system increases.

Figure 13:
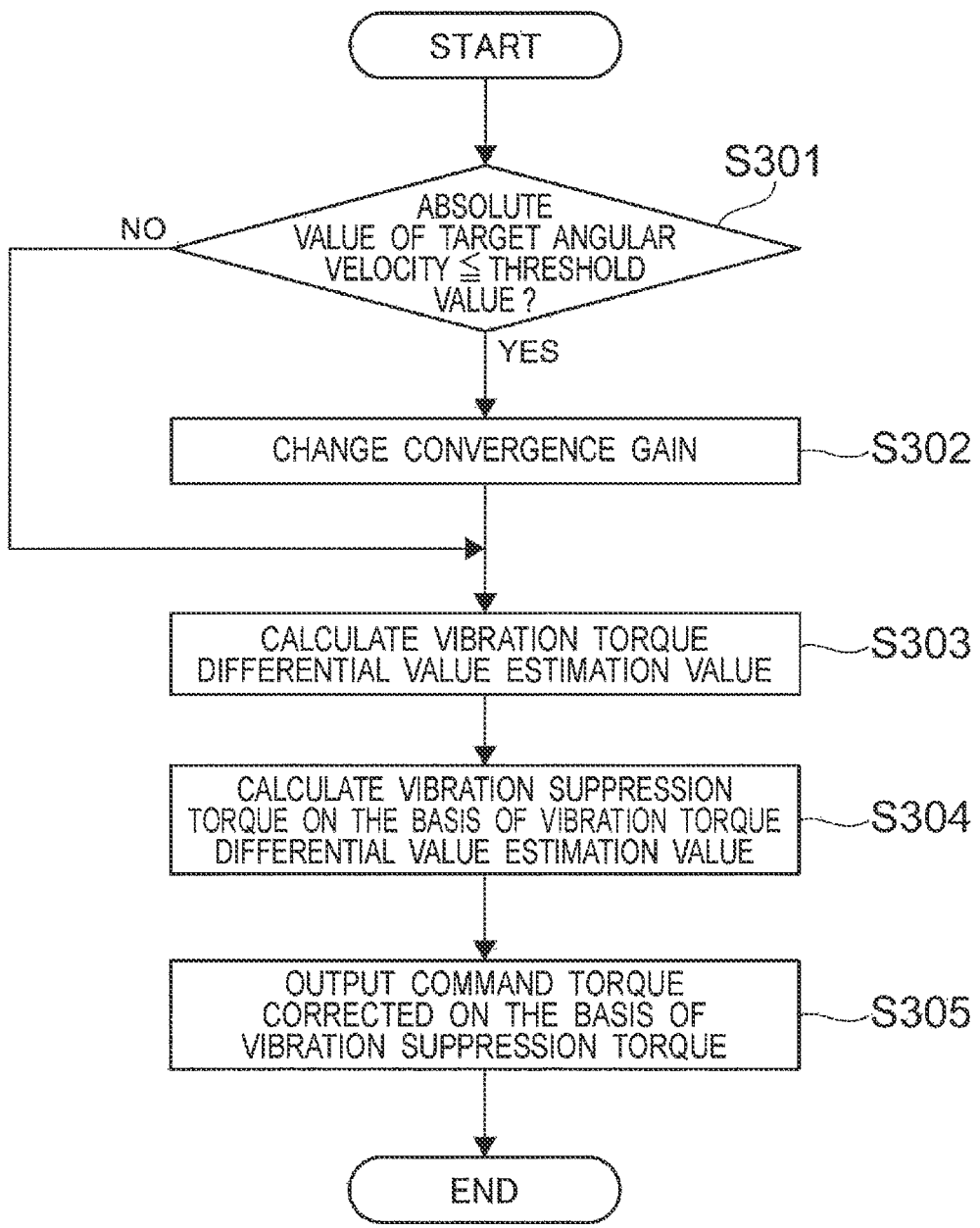
FIG. 13 is a flowchart showing an operation example of the convergence gain change unit, the periodic disturbance speed observer, and the like of the controller according to the third embodiment.

FIG. 13 is a flowchart showing an operation example of the convergence gain change unit 54, the periodic disturbance speed observer 52, the calculation unit 53, and the like of the controller 20 according to the third embodiment.

As illustrated, in the controller 20, the convergence gain change unit 54 determines whether or not the absolute value of the target angular velocity $d\theta_D/dt$ indicated to the controller 20 is equal to or less than a threshold value (0.01 rad/s, for example) (Step 301). If it is determined that the absolute value of the target angular velocity $d\theta_D/dt$ is equal to or less than the threshold value, the convergence gain change unit 54 changes the convergence gain $\xi$ in the periodic disturbance speed observer 52 (Step 302).

Next, the periodic disturbance speed observer 52 performs filter processing for extracting only the vibration speed component of the natural vibration frequency ω with respect to the disturbance torque d, thereby calculating the vibration torque differential value estimation value $(dd_\omega/dt)\hat{}$ (Step 303). That is, if the convergence gain $\xi$ has been changed in Step 302, the vibration torque differential value estimation value $(dd_\omega/dt)\hat{}$ is calculated using the changed convergence gain $\xi$. On the other hand, if the convergence gain $\xi$ has not been changed, the vibration torque differential value estimation value $(dd_\omega/dt)\hat{}$ is calculated using the convergence gain $\xi$ of the default value.

Next, the calculation unit 53 calculates the vibration suppression torque on the basis of the vibration torque differential value estimation value $(dd_\omega/dt)\hat{}$ calculated in Step 303 (Step 304).

Thus, the controller 20 outputs, to the motor 2, the command torque τ corrected on the basis of the vibration suppression torque calculated in Step 304 (Step 305).

Fourth Embodiment

In the fourth embodiment, a similar vibration suppression effect is obtained by performing negative feedback to the differential value of the vibration torque estimation value (hereinafter referred to as "vibration torque estimation value differential value") when the least squares estimation is used as in the second embodiment.

Figure 14:
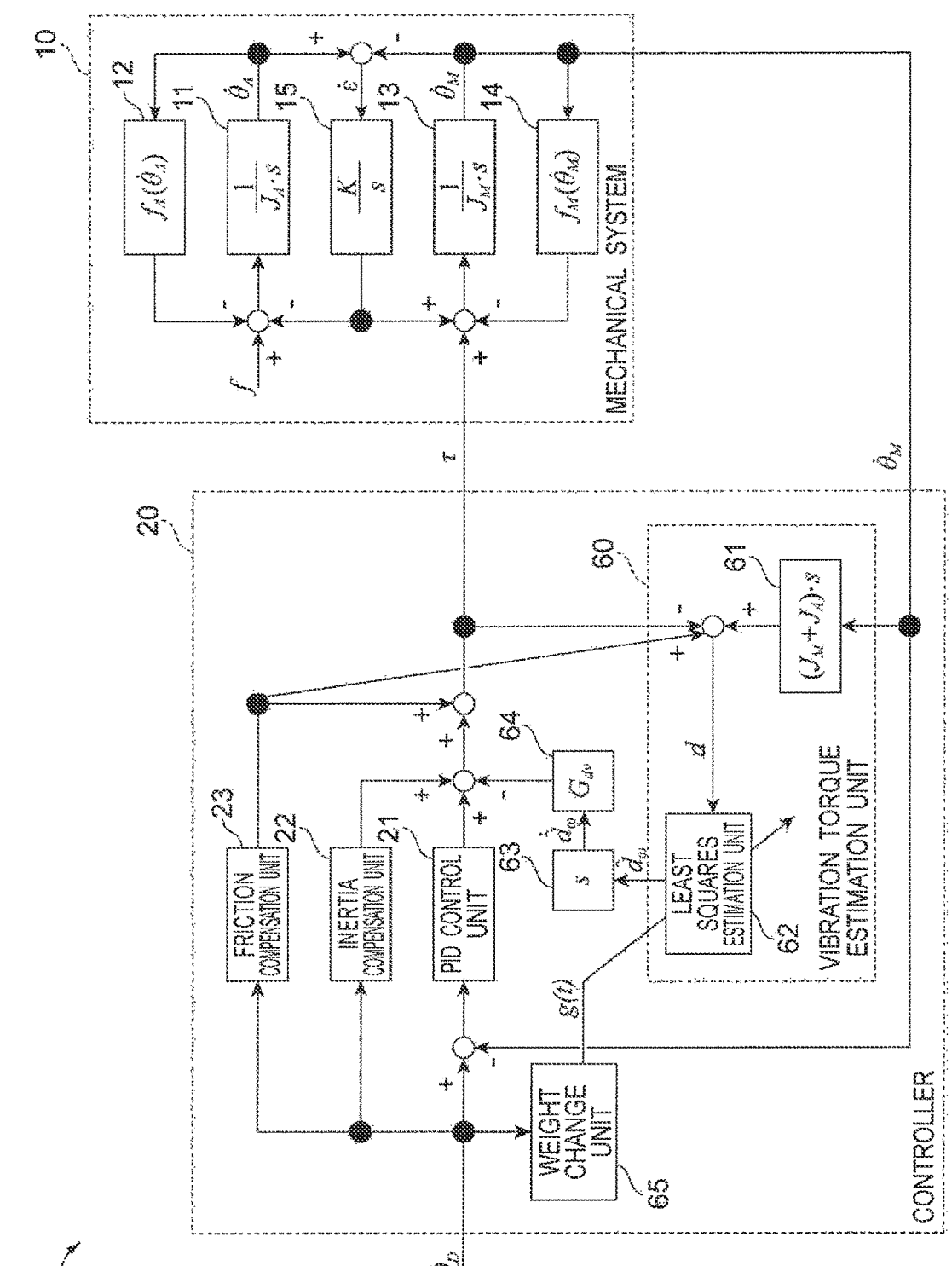
FIG. 14 is a block diagram showing a configuration example of a mechanical control system according to a fourth embodiment.

FIG. 14 is a block diagram showing a configuration example of a mechanical control system 400 according to the fourth embodiment. As illustrated, the mechanical control system 400 includes the mechanical system 10 and the controller 20 that controls the mechanical system 10. In the controller 20, for example, a CPU (not illustrated) reads a program from a storage means (not illustrated) such as a ROM and executes the program, thereby realizing each function. In the present embodiment, the controller 20 is provided as an example of the vibration suppression device.

Since the functional configuration of the mechanical system 10 is similar to those described in the first to third embodiments, the description thereof is omitted.

Next, the functional configuration of the controller 20 will be described.

As illustrated, the controller 20 includes a PID control unit 21, an inertia compensation unit 22, and a friction compensation unit 23. Since these configurations are similar to those described in the first to third embodiments, the description thereof is omitted.

The controller 20 includes a vibration torque estimation unit 60. Similarly to the vibration torque estimation unit 40 in the second embodiment, the vibration torque estimation unit 60 acquires the motor angular velocity $d\theta_M/dt$ output by the mechanical system 10, and outputs the vibration torque estimation value $d_\omega\hat{}$, which is an estimation value of the vibration torque generated in the elastic body 3 and acting on the motor 2. Specifically, the vibration torque estimation unit 60 includes a calculation unit 61 and a least squares estimation unit 62.

The calculation unit 61 acquires the motor angular velocity $d\theta_M/dt$ output by the mechanical system 10. Then, the inertial force is output by differentiating the result of multiplying this by the sum of the arm inertia $J_A$ and the motor inertia $J_M$.

The least squares estimation unit 62 acquires a disturbance torque d obtained by subtracting the command torque τ to the motor 2 from the sum of the inertia force output from the calculation unit 61 and the torque based on the friction model output from the friction compensation unit 23. Then, the vibration torque estimation value $d_\omega\hat{}$ is calculated by performing the least squares estimation with forgetting factor and weighted expressed by the following equation with respect to the disturbance torque d, and the calculated vibration torque estimation value $d_\omega\hat{}$ is output.

$$\begin{bmatrix} \vdots \\ g(t_{N-n}) \cdot \rho^{t_N - t_{N-n}} \cdot [\sin(\omega \cdot t_{N-n}) \quad \cos(\omega \cdot t_{N-n})] \\ \vdots \\ g(t_N) \cdot \rho^{t_N - t_N} \cdot [\sin(\omega \cdot t_N) \quad \cos(\omega \cdot t_N)] \end{bmatrix} \begin{bmatrix} a_{sin} \\ a_{cos} \end{bmatrix} = \quad [\text{Eq. 5}]$$

$$\begin{bmatrix} \vdots \\ g(t_{N-n}) \cdot \rho^{t_N - t_{N-n}} \cdot d(t_{N-n}) \\ \vdots \\ g(t_N) \cdot \rho^{t_N - t_N} \cdot d(t_N) \end{bmatrix}$$

$$A(t_N) \begin{bmatrix} a_{sin} \\ a_{cos} \end{bmatrix} = B(t_N)$$

$$\begin{bmatrix} \hat{a}_{sin} \\ \hat{a}_{cos} \end{bmatrix} = (A(t_N)^T \cdot A(t_N))^{-1} \cdot A(t_N)^T \cdot B(t_N)$$

$$\hat{d}_\omega(t) = [\sin(\omega \cdot t) \quad \cos(\omega \cdot t)] \begin{bmatrix} \hat{a}_{sin} \\ \hat{a}_{cos} \end{bmatrix}$$

where g(t) is the weight at time t, ρ is the forgetting coefficient, and d(t) is the raw disturbance value at the time t.

Furthermore, the controller 20 includes a calculation unit 63 and a calculation unit 64.

The calculation unit 63 acquires the vibration torque estimation value $d_\omega\hat{}$ output by the vibration torque estimation unit 60. Then, the vibration torque estimation value differential value $d(d_\omega\hat{})/dt$ is calculated by differentiating this, and the calculated vibration torque estimation value differential value $d(d_\omega\hat{})/dt$ is output.

In the present embodiment, the vibration torque estimation value differential value $d(d_\omega\hat{})/dt$ is used as an example of the measurement amount related to the mechanical system, and the vibration torque estimation unit 30 and the calculation unit 63 are provided as an example of the estimation means for estimating the measurement amount.

The calculation unit 64 acquires the vibration torque estimation value differential value $d(d_\omega\hat{})/dt$ output by the calculation unit 63. Then, the vibration suppression torque is calculated by multiplying this by the feedback gain $G_{dv}$, and the calculated vibration suppression torque is output.

Thus, the feedback torque output by the PID control unit 21 is added with the feedforward torque based on the inertia model output by the inertia compensation unit 22, and the vibration suppression torque output by the calculation unit 64 is subtracted from the result. In that sense, the calculation unit 64 is an example of the correction means for correcting the drive signal on the basis of the measurement amount.

Then, the result is added with the feedforward torque based on the friction model output by the friction compensation unit 23, and the result becomes the command torque τ to the motor 2.

In the fourth embodiment, the controller 20 includes a weight change unit 65 in addition to these components. The weight change unit 65 changes the weight g(t) of the equation used in the least squares estimation unit 62 in accordance with the target angular velocity $d\theta_D/dt$ indicated to the controller 20, thereby obtaining a similar result to that in the third embodiment. Specifically, the weight g(t) is only required to be made small when the target angular velocity $d\theta_D/dt$ is small. Similar graphs to those in FIG. 6 to FIG. 8 can be obtained also in the fourth embodiment, and in these graphs, the influence of the modeling error is eliminated by setting the weight g(t) to 0 when the absolute value of the target angular velocity $d\theta_D/dt$ becomes 0.01 rad/s or less. In the present embodiment, a time in which the target angular velocity $d\theta_D/dt$ becomes small is used as an example of a period in which the modeling error of the mechanical system increases, the weight g(t) is used as an example of a gain used in the estimation means, and the weight change unit 65 is provided as an example of the change means for changing the gain so that the influence of an increase in the modeling error becomes small in a period in which the modeling error of the mechanical system increases.

Figure 15:
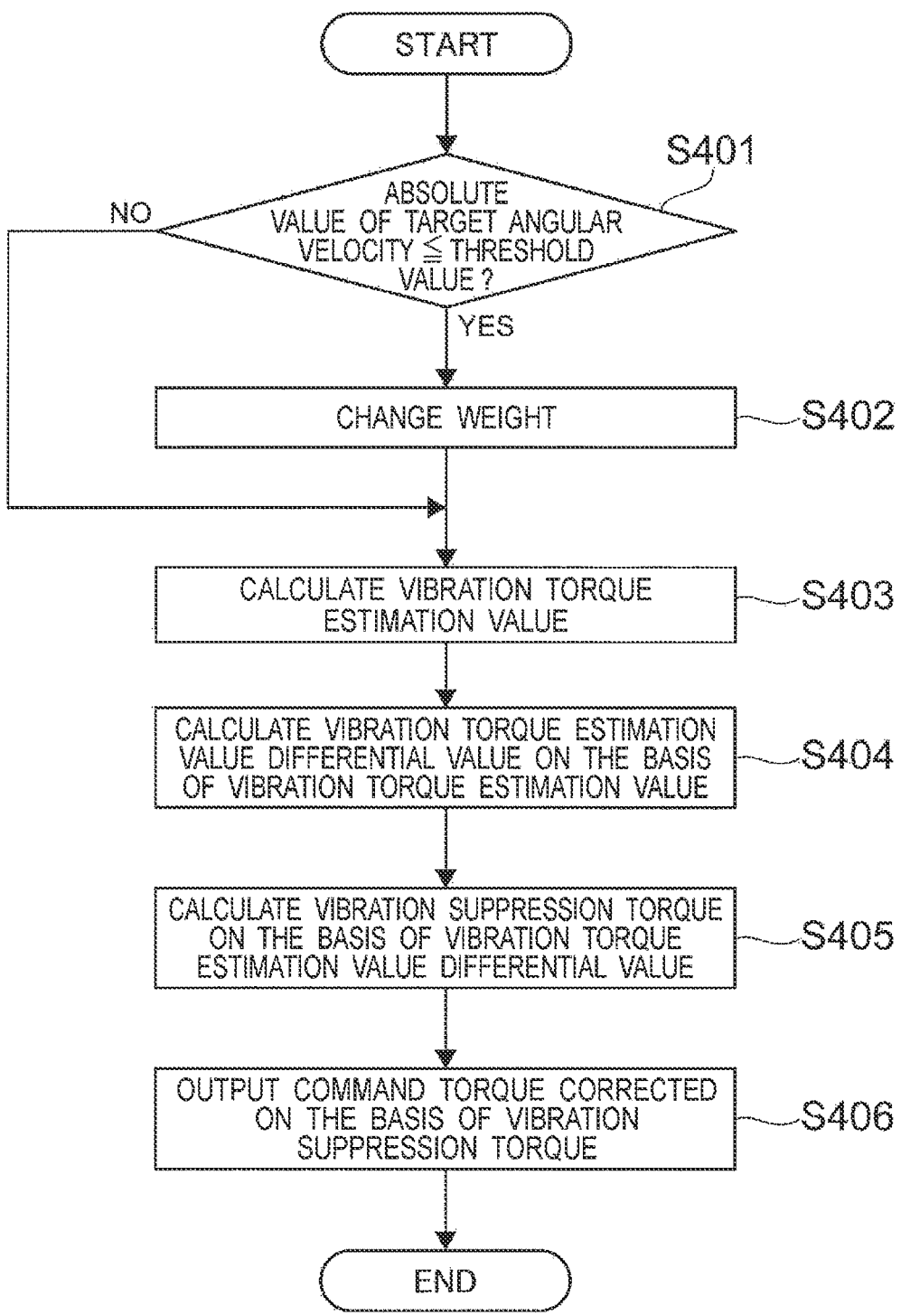
FIG. 15 is a flowchart showing an operation example of the weight change unit, the least squares estimation unit, and the like of the controller according to the fourth embodiment.

FIG. 15 is a flowchart showing an operation example of the weight change unit 65, the least squares estimation unit 62, the calculation unit 63, the calculation unit 64, and the like of the controller 20 according to the fourth embodiment.

As illustrated, in the controller 20, the weight change unit 65 determines whether or not the absolute value of the target angular velocity $d\theta_D/dt$ indicated to the controller 20 is equal to or less than a threshold value (0.01 rad/s, for example) (Step 401). If it is determined that the absolute value of the target angular velocity $d\theta_D/dt$ is equal to or less than the threshold value, the weight change unit 65 changes the weight g(t) in the least squares estimation unit 62 (Step 402).

Next, the least squares estimation unit 62 performs least squares estimation with forgetting factor and weight with respect to the disturbance torque d, thereby calculating the vibration torque estimation value $d_\omega\hat{}$ (Step 403). That is, if the weight g(t) has been changed in Step 402, the vibration torque estimation value $d_\omega\hat{}$ is calculated using the changed weight g(t). On the other hand, if the weight g(t) has not been changed, the vibration torque estimation value $d_\omega\hat{}$ is calculated using the weight g(t) of the default value.

Then, the calculation unit 63 calculates the vibration torque estimation value differential value $d(d_\omega\hat{})/dt$ by differentiating the vibration torque estimation value $d_\omega\hat{}$ calculated in Step 403 (Step 404).

Next, the calculation unit 64 calculates the vibration suppression torque on the basis of the vibration torque estimation value differential value $d(d_\omega\hat{})/dt$ calculated in Step 404 (Step 405).

Thus, the controller 20 outputs, to the motor 2, the command torque τ corrected on the basis of the vibration suppression torque calculated in Step 405 (Step 406).

Fifth Embodiment

In the first to fourth embodiments, the observer for estimating disturbance is configured, but in the fifth embodiment, an observer for estimating the arm angular velocity $d\theta_A/dt$ is configured.

Figure 16:
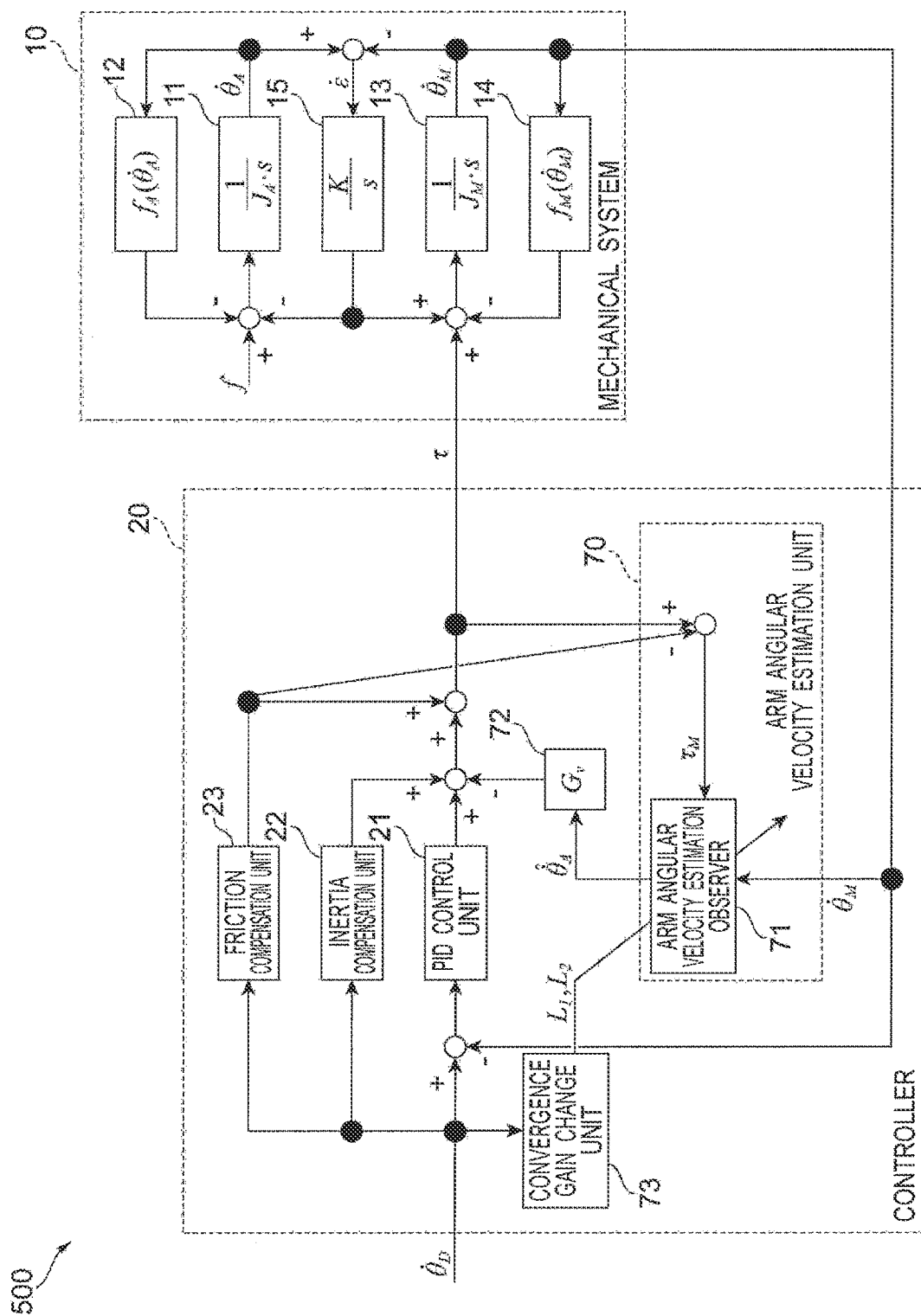
FIG. 16 is a block diagram showing a configuration example of a mechanical control system according to a fifth embodiment.

FIG. 16 is a block diagram showing a configuration example of a mechanical control system 500 according to the fifth embodiment. As illustrated, the mechanical control system 500 includes the mechanical system 10 and the controller 20 that controls the mechanical system 10. In the controller 20, for example, a CPU (not illustrated) reads a program from a storage means (not illustrated) such as a ROM and executes the program, thereby realizing each function. In the present embodiment, the controller 20 is provided as an example of the vibration suppression device.

Since the functional configuration of the mechanical system 10 is similar to those described in the first to fourth embodiments, the description thereof is omitted.

Next, the functional configuration of the controller 20 will be described.

As illustrated, the controller 20 includes a PID control unit 21, an inertia compensation unit 22, and a friction compensation unit 23. Since these configurations are similar to those described in the first to fourth embodiments, the description thereof is omitted.

The controller 20 includes an arm angular velocity estimation unit 70. The arm angular velocity estimation unit 70 acquires the motor angular velocity $d\theta_M/dt$ output by the mechanical system 10, and outputs the arm angular velocity estimation value $(d\theta_A/dt)\hat{}$. Specifically, the arm angular velocity estimation unit 70 includes an arm angular velocity estimation observer 71.

The arm angular velocity estimation observer 71 acquires the motor angular velocity $d\theta_M/dt$ output by the mechanical system 10 and torque τM obtained by subtracting the torque based on the friction model output by the friction compensation unit 23 from the command torque z to the motor 2. The arm angular velocity estimation value $(d\theta_A/dt)\hat{}$ is calculated by performing the processing shown as follows to the motor angular velocity $d\theta_M/dt$ and the torque τM, and the calculated arm angular velocity estimation value $(d\theta_A/dt)\hat{}$ is output.

Figure 17:
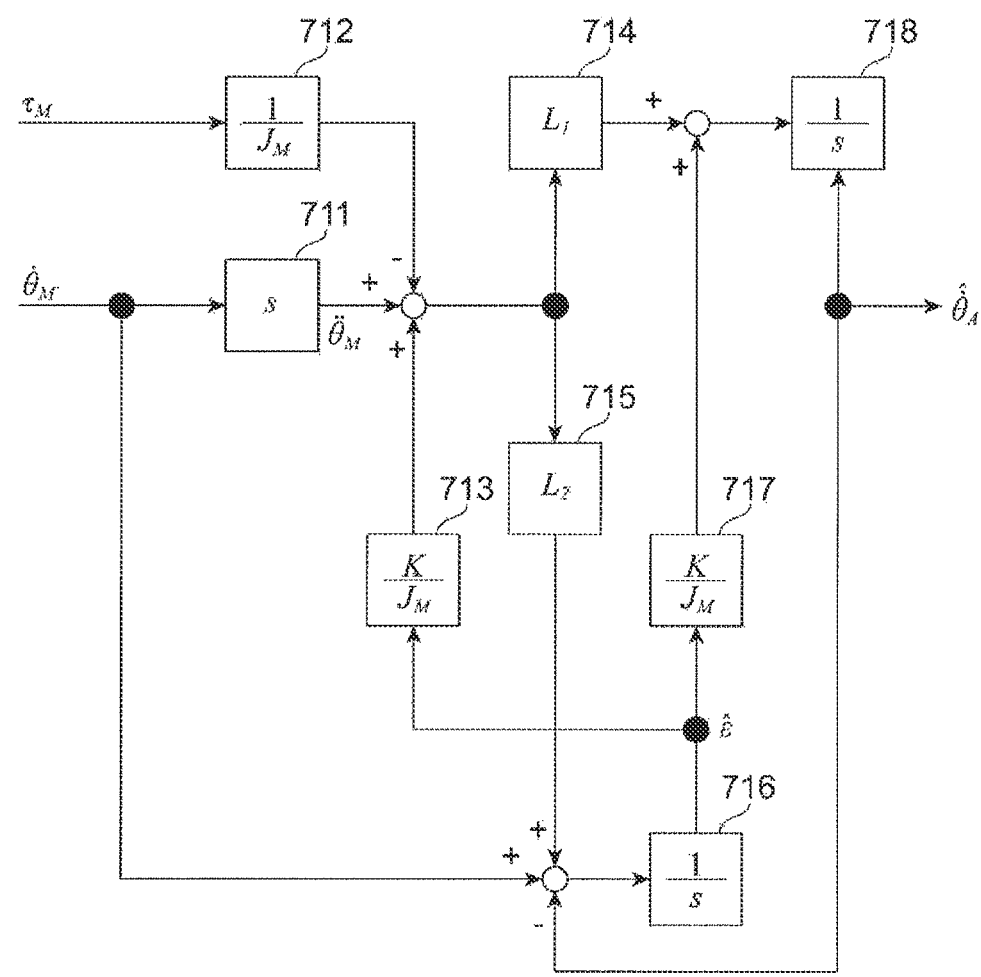
FIG. 17 is a block diagram showing a flow for calculating an arm angular velocity estimation value from a motor angular velocity and torque.

FIG. 17 is a block diagram showing a flow for calculating the arm angular velocity estimation value $(d\theta_A/dt)\hat{}$ from the motor angular velocity $d\theta_M/dt$ and the torque τM.

As illustrated, in the arm angular velocity estimation observer 71, a calculation unit 711 calculates a motor angular acceleration $d^2\theta_M/dt^2$ by differentiating the motor angular velocity $d\theta_M/dt^2$. A calculation unit 712 calculates $\tau M/J_M$ by multiplying torque τM by $1/J_M$. Furthermore, a calculation unit 713 calculates $K\varepsilon\hat{}/J_M$ by multiplying $\varepsilon\hat{}$, calculated as described later, by $K/J_M$. Then, a calculation unit 714 multiplies the result of subtracting $\tau M/J_M$ from the motor angular acceleration $d^2\theta_M/dt^2$ and adding $K\varepsilon\hat{}/J_M$ to the result by a convergence gain L1, thereby calculating $L_1\times(d^2\theta_M/dt^2-\tau M/J_M+K\varepsilon\hat{}/J_M)$.

On the other hand, a calculation unit 715 multiplies the result of subtracting $\tau M/J_M$ from the motor angular acceleration $d^2\theta_M/dt^2$ and adding $K\varepsilon\hat{}/J_M$ to the result by a convergence gain $L_2$, thereby calculating $L_2\times(d^2\theta_M/dt^2-\tau M/J_M+K\varepsilon\hat{}/J_M)$. A calculation unit 716 adds $L_2\times(d^2\theta_M/dt^2-\tau M/J_M+K\varepsilon\hat{}/J_M)$ to the motor angular velocity $d\theta_M/dt$ and integrates the result of subtracting the arm angular velocity estimation value $(d\theta_A/dt)\hat{}$ from the result, thereby calculating $\varepsilon\hat{}$. Furthermore, a calculation unit 717 calculates $K\varepsilon\hat{}/J_A$ by multiplying $\varepsilon\hat{}$ by $K/J_A$.

Thus, a calculation unit 718 integrates the result of adding $K\varepsilon\hat{}/J_A$ to $L_1\times(d^2\theta_M/dt^2-\tau M/J_M+K\varepsilon\hat{}/J_M)$, thereby calculating the arm angular velocity estimation value $(d\theta_A/dt)\hat{}$.

Thus, the arm angular velocity estimation observer 71 is implemented in the form of a minimal dimension observer. Normally, the differential value $d^2\theta_M/dt^2$ of the state quantity $d\theta_M/dt$ is not used and is replaced by the output values $\tau M$, f, but in this embodiment, the arm angular velocity estimation observer 71 is implemented in the form where the differential value $d^2\theta_M/dt^2$ of the state quantity $d\theta_M/dt$ is left without being replaced by the output values $\tau M$, f. Note that this is an example of estimating the measurement amount by using a differential value of the state quantity in an equation of state of the mechanical system. Such a technique is applicable not only in the fifth embodiment but also in the first to fourth embodiments.

In the present embodiment, the arm angular velocity estimation value $(d\theta_A/dt)\hat{}$ is used as an example of the measurement amount related to the mechanical system, and the arm angular velocity estimation unit 70 is provided as an example of the estimation means for estimating the measurement amount.

With reference to FIG. 16 again, the controller 20 includes a calculation unit 72. The calculation unit 72 acquires the arm angular velocity estimation value $(d\theta_A/dt)\hat{}$ output by the arm angular velocity estimation unit 70. Then, the vibration suppression torque is calculated by multiplying this by the feedback gain $G_v$, and the calculated vibration suppression torque is output.

Thus, the feedback torque output by the PID control unit 21 is added with the feedforward torque based on the inertia model output by the inertia compensation unit 22, and the vibration suppression torque output by the calculation unit 72 is subtracted from the result. In that sense, the calculation unit 72 is an example of the correction means for correcting the drive signal on the basis of the measurement amount. Then, the result is added with the feedforward torque based on the friction model output by the friction compensation unit 23, and the result becomes the command torque $\tau$ to the motor 2.

In the fifth embodiment, the controller 20 includes a convergence gain change unit 73 in addition to these components. The convergence gain change unit 73 changes the convergence gains $L_1$ and $L_2$ used in the arm angular velocity estimation observer 71 in accordance with the target angular velocity $d\theta_D/dt$ indicated to the controller 20. Specifically, the convergence gains $L_1$ and $L_2$ are only required to be made small when the target angular velocity $d\theta_D/dt$ is small. Hereinafter, the influence of the modeling error is eliminated by setting the convergence gains $L_1$ and $L_2$ to 0 when the absolute value of the target angular velocity $d\theta_D/dt$ becomes 0.01 rad/s or less. In the present embodiment, a time in which the target angular velocity $d\theta_D/dt$ becomes small is used as an example of a period in which the modeling error of the mechanical system increases, the convergence gains $L_1$ and $L_2$ are used as an example of a gain used in the estimation means, and the convergence gain change unit 73 is provided as an example of the change means for changing the gain so that the influence of an increase in the modeling error becomes small in a period in which the modeling error of the mechanical system increases.

Figure 18:
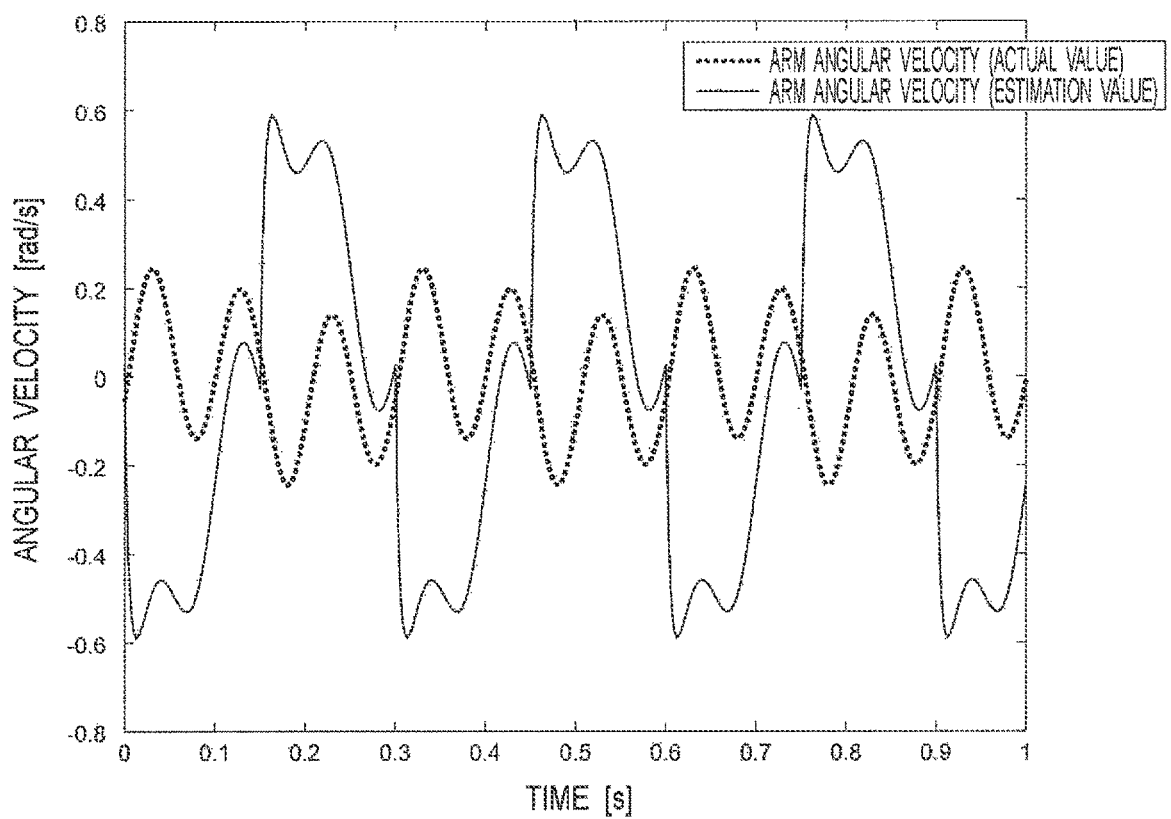
FIG. 18 is a graph showing a difference between an actual value of the arm angular velocity and an arm angular velocity estimation value when the convergence gain has not been changed in accordance with the target angular velocity.
Figure 19:
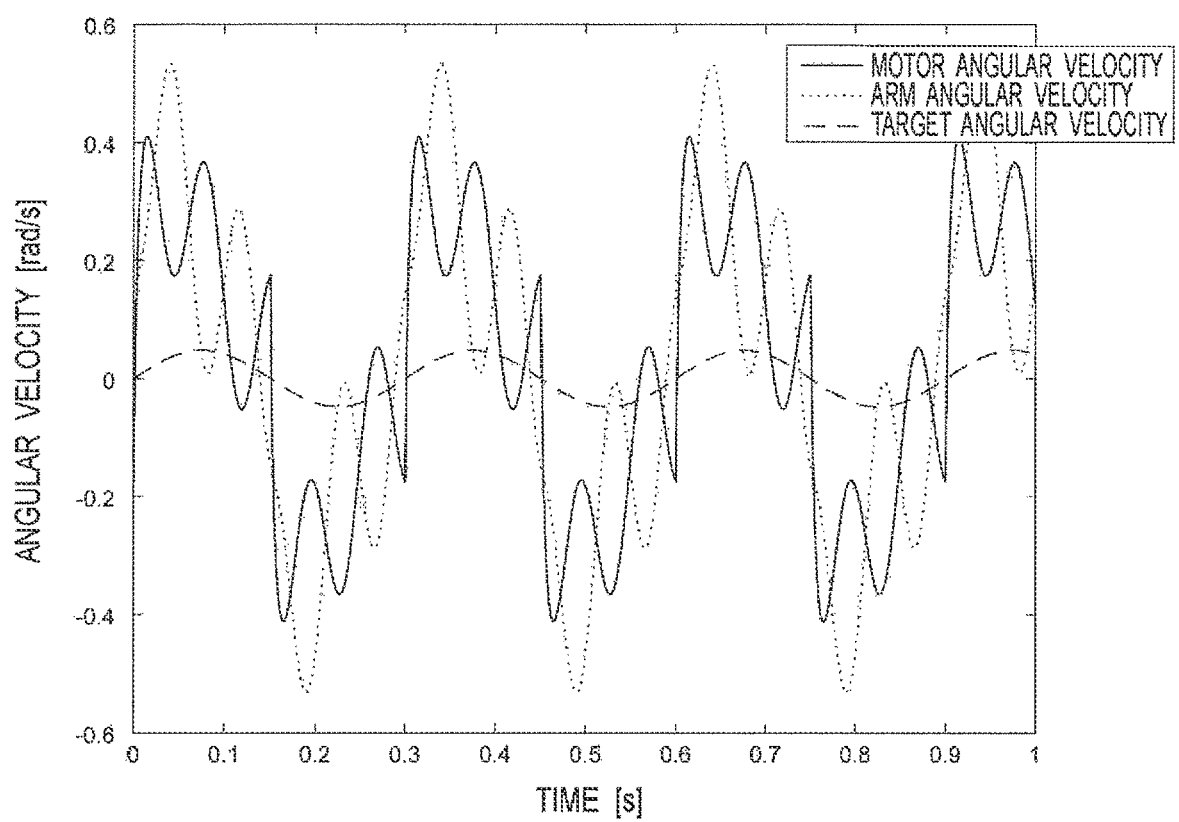
FIG. 19 is a graph showing a result of feedback performed using the arm angular velocity estimation value when the convergence gain has not been changed in accordance with the target angular velocity.

FIGS. 18 and 19 are graphs showing simulation results when the convergence gains $L_1$ and $L_2$ have not been changed in accordance with the target angular velocity $d\theta_D/dt$. Of them, FIG. 18 shows the difference between the actual value of the arm angular velocity and the arm angular velocity estimation value. This figure indicates that the arm angular velocity estimation value deviates from the actual value of the arm angular velocity due to the influence of the modeling error. FIG. 19 shows the result of performing feedback using the arm angular velocity estimation value of FIG. 18. This figure indicates that the motor angular velocity greatly deviates from the target angular velocity by feeding back the arm angular velocity estimation value deviated from the actual value of the arm angular velocity. Due to this, it is presumed that the arm angular velocity also deviates greatly from the target angular velocity of the arm 1.

Figure 20:
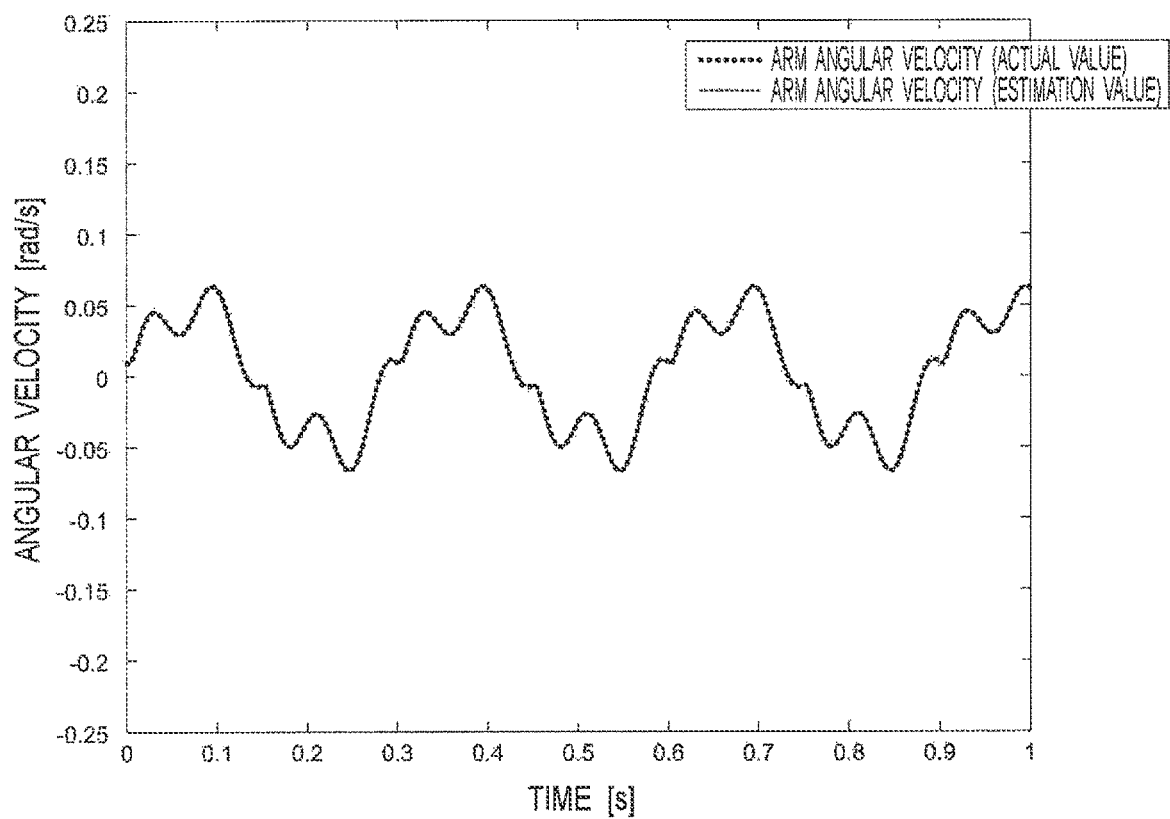
FIG. 20 is a graph showing a difference between an actual value of the arm angular velocity and an arm angular velocity estimation value when the convergence gain has been changed in accordance with the target angular velocity.
Figure 21:
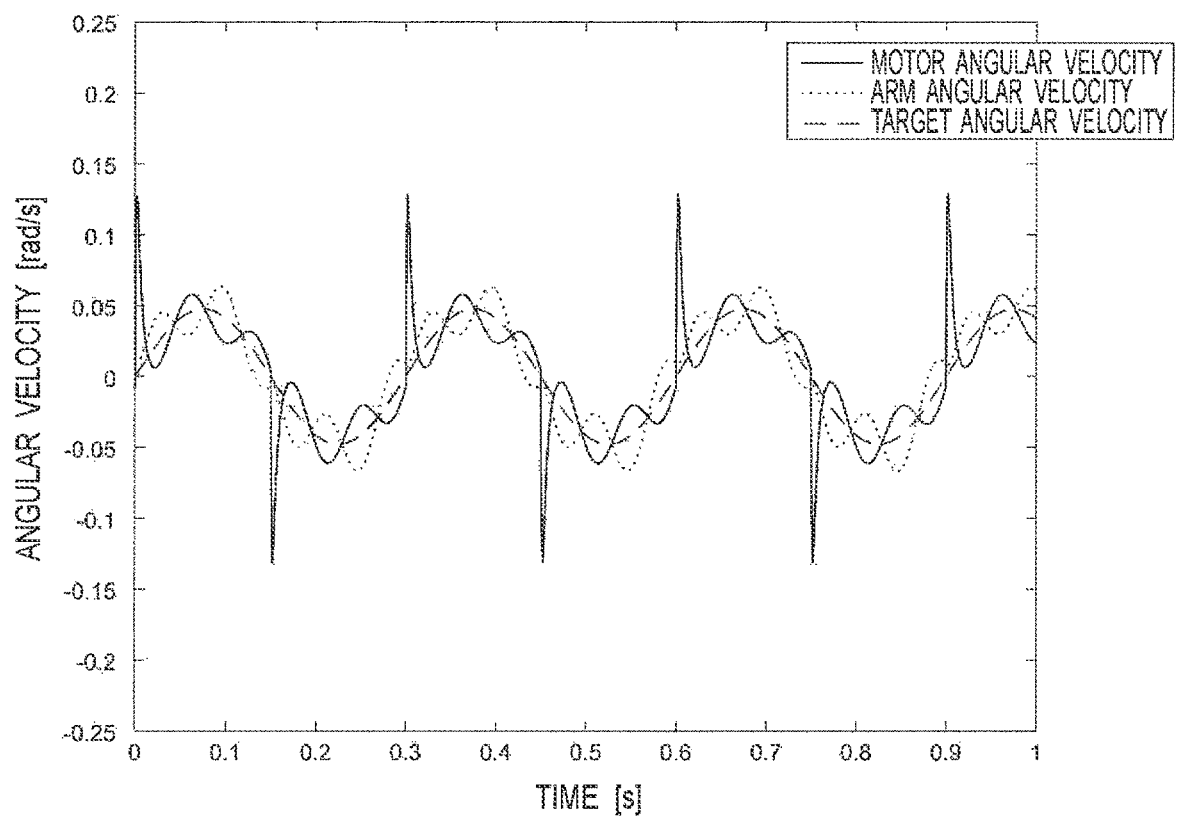
FIG. 21 is a graph showing a result of feedback performed using the arm angular velocity estimation value when the convergence gain has been changed in accordance with the target angular velocity.

On the other hand, FIGS. 20 and 21 are graphs showing simulation results when the convergence gains $L_1$ and $L_2$ have been changed in accordance with the target angular velocity $d\theta_D/dt$. Of them, FIG. 20 shows the difference between the actual value of the arm angular velocity and the arm angular velocity estimation value. This figure indicates that the arm angular velocity estimation value substantially coincident with the actual value of the arm angular velocity has been successfully obtained. FIG. 21 shows the result of performing feedback using the arm angular velocity estimation value of FIG. 20. This figure indicates that a good vibration suppression effect can be obtained by feeding back the arm angular velocity estimation value substantially coincident with the actual value of the arm angular velocity.

Figure 22:
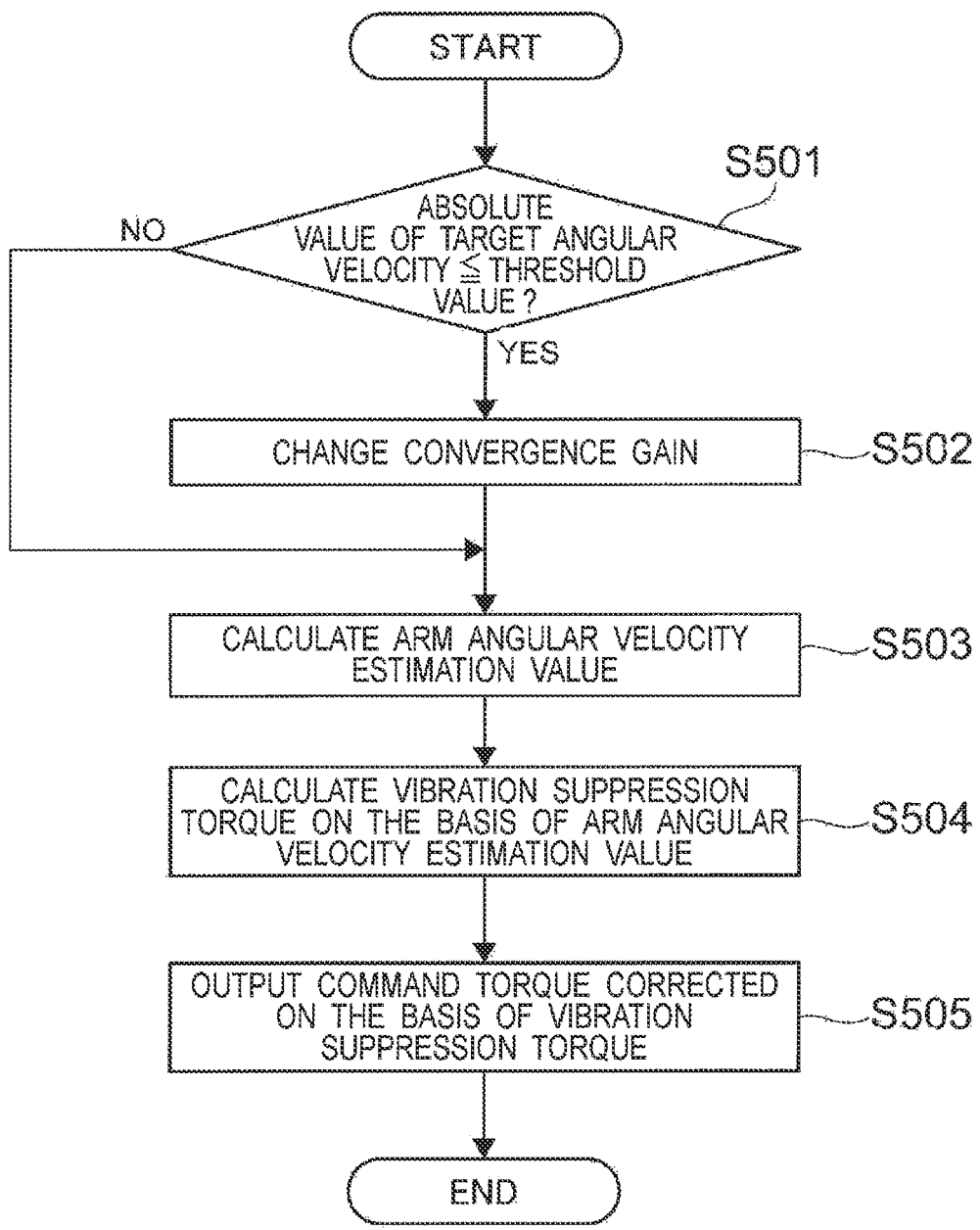
FIG. 22 is a flowchart showing an operation example of the convergence gain change unit, an arm angular velocity estimation observer, and the like of the controller according to the fifth embodiment.

FIG. 22 is a flowchart showing an operation example of the convergence gain change unit 73, the arm angular velocity estimation observer 71, the calculation unit 72, and the like of the controller 20 according to the fifth embodiment.

As illustrated, in the controller 20, the convergence gain change unit 73 determines whether or not the absolute value of the target angular velocity $d\theta_D/dt$ indicated to the controller 20 is equal to or less than a threshold value (0.01 rad/s, for example) (Step 501). If it is determined that the absolute value of the target angular velocity $d\theta_D/dt$ is equal to or less than the threshold value, the convergence gain change unit 73 changes the convergence gains $L_1$ and $L_2$ in the arm angular velocity estimation observer 71 (Step 502).

Next, the arm angular velocity estimation observer 71 performs the processing shown in FIG. 17, thereby calculating the arm angular velocity estimation value $(d\theta_A/dt)\hat{}$ (Step 503). That is, if the convergence gains $L_1$ and $L_2$ have been changed in Step 502, the arm angular velocity estimation value $(d\theta_A/dt)\hat{}$ is calculated using the changed convergence gains $L_1$ and $L_2$. On the other hand, if the convergence gains $L_1$ and $L_2$ have not been changed, the arm angular velocity estimation value $(d\theta_A/dt)\hat{}$ is calculated using the convergence gains $L_1$ and $L_2$ of the default value.

Next, the calculation unit 72 calculates the vibration suppression torque on the basis of the arm angular velocity estimation value $(d\theta_A/dt)\hat{}$ calculated in Step 503 (Step 504).

Thus, the controller 20 outputs, to the motor 2, the command torque z corrected on the basis of the vibration suppression torque calculated in Step 504 (Step 505).

[Variation]

In the first to fifth embodiments, the vibration suppression torque is calculated on the basis of the vibration torque estimation value $d_\omega\hat{}$, the vibration torque differential value estimation value $(dd_\omega/dt)\hat{}$, the vibration torque estimation value differential value $d(d_\omega\hat{})/dt$, and the arm angular velocity estimation value $(d\theta_A/dt)\hat{}$, but the present invention is not limited thereto. The vibration suppression torque may be calculated on the basis of an estimation value $(d\varepsilon/dt)\hat{}$ of the elastic deformation speed of the elastic body 3, for example.

The invention claimed is:

1. A vibration suppression device that suppresses vibration of an operation unit in a mechanical system having a natural vibration mode including the operation unit, an actuator unit that operates the operation unit, and an elastic body that couples the operation unit and the actuator unit, the vibration suppression device comprising:
a computer processor configured to:
generate a drive signal for driving the actuator unit;
estimate a value of a measurement related to the mechanical system;
correct the generated drive signal on a basis of the estimated value; and
change a gain that is used when the estimated value is estimated so that an influence of an increase in a modeling error is reduced in a period in which the modeling error increases, wherein the period in which the modeling error increases is a period in which a target angular velocity is equal to or less than a threshold value,
wherein the estimated value of the measurement is an estimation value of vibration torque of the actuator unit or a differential value of an estimation value of vibration torque of the actuator unit,
wherein the computer processor calculates an estimation value of the vibration torque from an estimated disturbance by performing a least squares estimation with forgetting factor and weight for an estimated disturbance, and
wherein the computer processor uses a weight in the least squares estimation with forgetting factor and weight as the gain.

2. The vibration suppression device according to claim 1, wherein the period in which the modeling error increases is a period before and after a direction of an angular velocity of the actuator unit is inverted.

3. The vibration suppression device according to claim 1, wherein the computer processor estimates the value of the measurement by using a differential value of a state quantity in an equation of state of the mechanical system.

4. The vibration suppression device according to claim 1, wherein the computer processor corrects the drive signal by performing positive feedback based on the value of the measurement to the drive signal.

5. A vibration suppression method that suppresses vibration of an operation unit in a mechanical system having a natural vibration mode including the operation unit, an actuator unit that operates the operation unit, and an elastic body that couples the operation unit and the actuator unit, the vibration suppression method comprising:
a step of estimating a value of a measurement related to the mechanical system with changing a gain so that an influence of an increase in a modeling error is reduced in a period in which the modeling error increases, and without changing the gain except for the period, wherein the period in which the modeling error increases is a period in which an angular velocity is equal to or less than a threshold value; and
a step of correcting a drive signal for driving the actuator unit on a basis of the estimated value,
wherein the estimated value of the measurement is an estimation value of vibration torque of the actuator unit or a differential value of an estimation value of vibration torque of the actuator unit,
wherein an estimation value of the vibration torque is calculated from an estimated disturbance by performing a least squares estimation with forgetting factor and weight for an estimated disturbance, and
wherein a weight in the least squares estimation with forgetting factor and weight is used as the gain.

6. A non-transitory computer-readable medium storing a program that causes a computer to function as a vibration suppression device that suppresses vibration of an operation unit in a mechanical system having a natural vibration mode including the operation unit, an actuator unit that operates the operation unit, and an elastic body that couples the operation unit and the actuator unit, the program causing the computer to:
generate a drive signal for driving the actuator unit,
estimate a value of a measurement related to the mechanical system,
correct the drive signal generated by the generation means on a basis of the estimated value, and
change a gain used to estimate the value of the measurement so that an influence of an increase in a modeling error is reduced in a period in which the modeling error increases, wherein the period in which the modeling error increases is a period in which an angular velocity is equal to or less than a threshold value,
wherein the estimated value of the measurement is an estimation value of vibration torque of the actuator unit or a differential value of an estimation value of vibration torque of the actuator unit,
wherein the computer calculates an estimation value of the vibration torque from an estimated disturbance by performing a least squares estimation with forgetting factor and weight for an estimated disturbance, and
wherein the computer uses a weight in the least squares estimation with forgetting factor and weight as the gain.

* * * * *